United States Patent
Nagey et al.

(10) Patent No.: US 10,268,637 B2
(45) Date of Patent: Apr. 23, 2019

(54) OFF-LINE LOG SYSTEM

(71) Applicant: Dharma Platform, Inc., Washington, DC (US)

(72) Inventors: Stefan Anastas Nagey, Washington, DC (US); Jesse Erin Berns, Washington, DC (US)

(73) Assignee: DHARMA PLATFORM, INC., Washington, DC (US)

( * ) Notice: Subject to any disclaimer, the term of this patent is extended or adjusted under 35 U.S.C. 154(b) by 0 days.

(21) Appl. No.: 15/791,858

(22) Filed: Oct. 24, 2017

(65) Prior Publication Data
US 2019/0005085 A1    Jan. 3, 2019

Related U.S. Application Data

(60) Provisional application No. 62/572,660, filed on Oct. 16, 2017, provisional application No. 62/526,151, filed on Jun. 28, 2017.

(51) Int. Cl.
| | | |
|---|---|---|
| *G06F 16/23* | (2019.01) | |
| *G06F 17/30* | (2006.01) | |
| *G06F 16/27* | (2019.01) | |

(52) U.S. Cl.
CPC ...... *G06F 16/2365* (2019.01); *G06F 16/2358* (2019.01); *G06F 16/2372* (2019.01); *G06F 16/27* (2019.01); *G06F 17/30368* (2013.01); *G06F 17/30371* (2013.01); *G06F 17/30374* (2013.01); *G06F 17/30575* (2013.01)

(58) Field of Classification Search
CPC ........ G06F 17/30303; G06F 17/30581; G06N 5/02
See application file for complete search history.

(56) References Cited

U.S. PATENT DOCUMENTS

| | | | |
|---|---|---|---|
| 2007/0005579 A1 | 1/2007 | Grewal et al. | |
| 2008/0022089 A1* | 1/2008 | Leedom | H04L 63/068 713/156 |

(Continued)

OTHER PUBLICATIONS

Non-Final Office Action dated Feb. 12, 2018 of U.S. Appl. No. 15/791,836 by Augustyn, J.R., filed Oct. 24, 2017.

(Continued)

*Primary Examiner* — Taelor Kim
(74) *Attorney, Agent, or Firm* — Perkins Coie LLP

(57) ABSTRACT

Introduced are systems and methods that enable modification of logs in multiple off-line databases. Multiple off-line devices can mistakenly associate different respondents with the same identification (ID) unique to the system. When the multiple off-line devices synchronize with each other, or synchronize with a server hosting the central database, the software running on the off-line devices, or on the server detects that the modified logs come from different respondents, and the software assigns two different IDs unique to system to the logs. In another embodiment, multiple off-line devices can mistakenly associate the same respondent with two different IDs unique to the system. When the multiple off-line devices synchronize with each other or with the server, the software running on the off-line devices, or the server detects that the modified logs come from the same respondent, and the software assigns the logs to the same ID unique to system.

29 Claims, 19 Drawing Sheets

(56) References Cited

U.S. PATENT DOCUMENTS

| | | | |
|---|---|---|---|
| 2008/0270486 A1* | 10/2008 | Hind | G06F 17/30581 |
| 2009/0037523 A1 | 2/2009 | Kolke et al. | |
| 2010/0121807 A1* | 5/2010 | Perrier | G06Q 30/02 |
| | | | 706/47 |
| 2011/0151837 A1* | 6/2011 | Winbush, III | H04W 8/22 |
| | | | 455/412.1 |
| 2012/0130953 A1 | 5/2012 | Hind et al. | |
| 2014/0032506 A1* | 1/2014 | Hoey | G06F 17/30303 |
| | | | 707/691 |
| 2016/0098942 A1* | 4/2016 | Messier | G09B 19/0092 |
| | | | 434/127 |

OTHER PUBLICATIONS

U.S. Appl. No. 15/791,836 by Augustyn, J.R., filed Oct. 24, 2017.

\* cited by examiner

400

| AT&T | 12:32 | 31% |
| --- | --- | --- |
| ← | Enrollment | 0/6 |

410 Identifier
422 0 - 10000000

420 Name
432

430 Country of origin

| Mexico | Canada | Iraq |

440 Gender

| Female | Male |

450 Age
0 - 110

460 Occupation

| med doctor | technical | nurse |

OFF-LINE LOG SYSTEM

CROSS-REFERENCE TO RELATED APPLICATIONS

This application claims priority to the U.S. provisional patent application Ser. No. 62/572,660 filed Oct. 16, 2017, and U.S. provisional patent application Ser. No. 62/526,151 filed Jun. 28, 2017 which are incorporated herein by this reference in their entirety.

TECHNICAL FIELD

The present application is related to mobile databases, and more specifically to methods and systems that enable off-line editing and creation of logs in a database.

BACKGROUND

Mobile databases today enable multiple mobile devices to download information from a central database, and access this information when the mobile devices are off-line, i.e., the mobile devices cannot access the central database. However, the off-line mobile devices cannot modify the downloaded information, such as edit existing logs or create new logs because such modification increases the chances that the central database will not be able to correctly synchronize the newly modified information, once the multiple mobile devices come online.

SUMMARY

Introduced here are systems and methods that enable modification of logs in multiple off-line databases spread across multiple off-line devices. In one embodiment, multiple off-line devices can mistakenly associate different respondents with the same identification (ID) unique to the system. When the multiple off-line devices synchronize with each other, or synchronize with a server hosting the central database, the software running on the off-line devices, or on the server detects that the modified logs come from different respondents, and the software assigns the logs to two different IDs unique to system.

In another embodiment, multiple off-line devices can mistakenly associate the same respondent with two different IDs unique to the system. Similarly, when the multiple off-line devices synchronize with each other, or with the server, the software running on the off-line devices, or on the server detects that the modified logs come from the same respondent, and the software assigns the logs to the same ID unique to system. Additionally, modification of off-line databases includes creation and editing of parent logs that have dependent logs. When a value of the parent log has been modified, the system automatically detects that the dependent logs should be modified as well, and notifies the user.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

FIG. 4 is an enrollment form associated with the project.

DETAILED DESCRIPTION

Terminology

Figure 1:
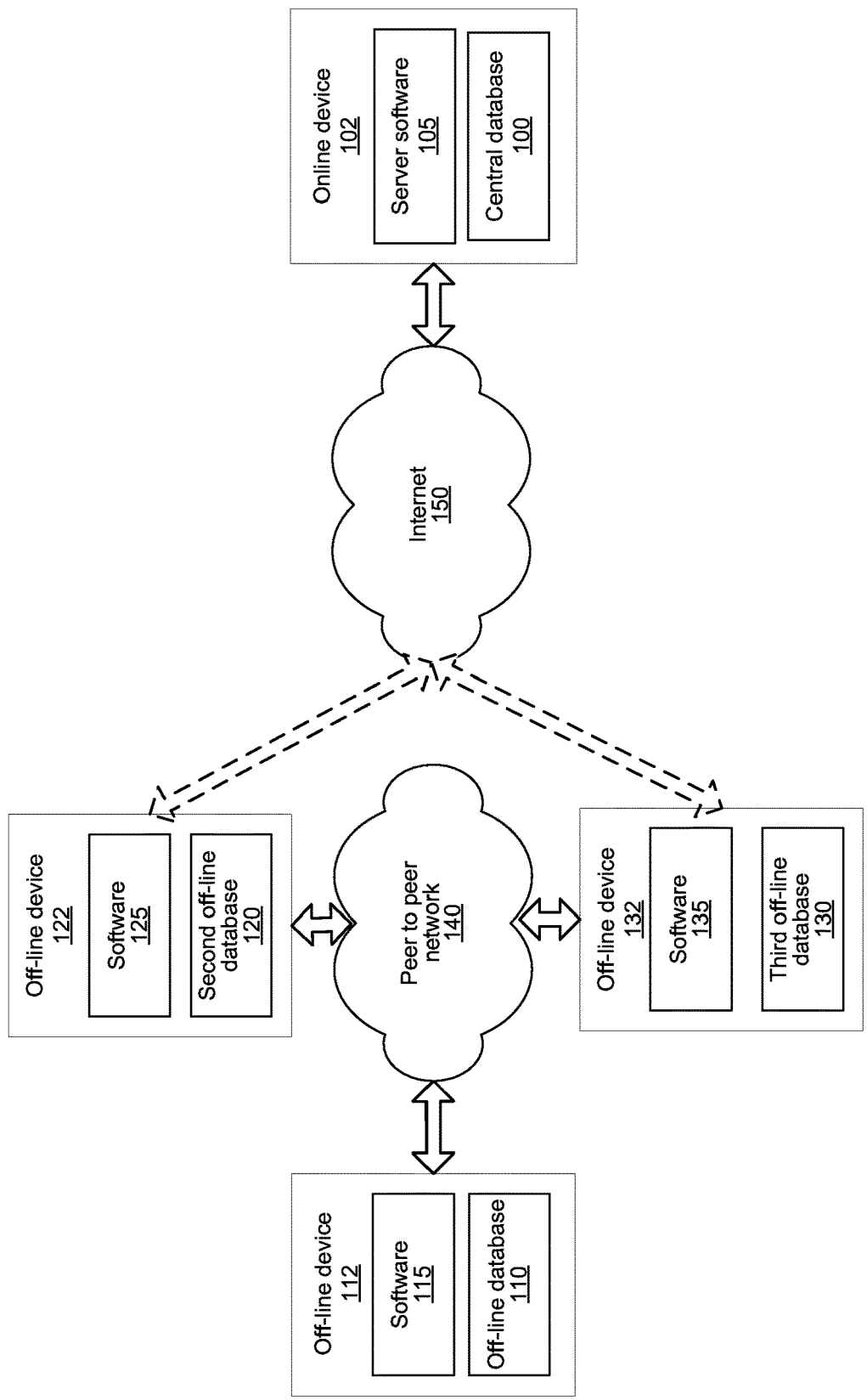
FIG. 1 is a system for maintaining a central database associated with a server using a plurality of off-line databases associated with a plurality of off-line devices.

Brief definitions of terms, abbreviations, and phrases used throughout this application are given below.

Reference in this specification to "database" includes a flat database, relational database, a hierarchical database, risk database, nested database, etc.

Reference in this specification to "log" includes enrollment form, enrollment record, multiple entry form, and/or longitudinal record.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Off-line Record System

Introduced here are systems and methods that enable modification of logs in multiple off-line databases spread across multiple off-line devices. In one embodiment, multiple off-line devices can mistakenly associate different respondents with the same identification (ID) unique to the system. When the multiple off-line devices synchronize with each other, or synchronize with a server hosting the central database, the software running on the off-line devices, or on the server detects that the modified logs come from different respondents, and the software assigns the logs to two different IDs unique to system.

In another embodiment, multiple off-line devices can mistakenly associate the same respondent with two different IDs unique to the system. Similarly, when the multiple off-line devices synchronize with each other, or with the server, the software running on the off-line devices, or on the server detects that the modified logs come from the same respondent, and the software assigns the logs to the same ID unique to system. Additionally, modification of off-line databases includes creation and editing of parent logs that have dependent logs. When a value of the parent log has been modified, the system automatically detects that the dependent logs should be modified as well, and notifies the user.

FIG. 1 is a system for preventing corruption of a central database associated with a server 102 using multiple off-line databases (i.e. intermittently online databases) associated with multiple off-line devices 112, 122, 132.

A technical problem arising in the context of intermittently online databases synchronizing with the central database is corruption of the central database. Corruption of the central database can be done by creating duplicate logs for the same respondent, or creating same log for different respondents. A log can be enrollment form, enrollment record, longitudinal record, and/multiple entry form. The technical solution presented in this application increases the accuracy of the central database, by preventing corruption of the central database, and enables the creation and maintenance of the central database along with multiple intermittently online databases.

The system includes multiple off-line devices 112, 122, 132 which run software 115, 125, 135 for managing off-line databases 110, 120, 130, an online device ("server") 102 which runs a server software 105 for managing a central database 100, a communication network such as the Internet 150, and/or a peer to peer network 140. The server 102 storing the central database 100 can be one or more Internet nodes, servers, a cloud, fixed terminals, stations, units, devices, multimedia computers, desktop computers, laptop computers, notebook computers, netbook computers, tablet computers, etc., or any combination thereof.

The devices 112, 122, 132 associated with the software 115, 125, 135, and the databases 110, 120, 130 can be any type of device such as mobile terminal, fixed terminal, or portable terminal including a cell phone, a tablet, a watch, personal digital assistant, etc. The devices 112, 122, 132 can gain and lose access to the Internet, and thus have only intermittent access to the central database 100. The software 115, 125, 135, and the off-line databases 110, 120, 130 can communicate with each other using the peer-to-peer network 140. The peer-to-peer network 140 can be connected to the Internet, but does not have to be. The peer-to-peer network 140 can be a local area network, metropolitan area network, a wide area network, or any other suitable packet-switched network. The peer-to-peer network 140 can be a mesh network, can use a short range wireless protocol, such as a Bluetooth protocol, and/or can be a cellular network.

The software 115, 125, 135, and the off-line databases 110, 120, 130 can communicate with each other using the peer-to-peer network 140 without having a direct access to the Internet 150, and the central database 100. For example, when devices 112, 122 are within 10 m of each other and have the software 115, 125 running, the two off-line databases 110, 120 can exchange the data contained in the two databases 110, 120.

When one of the off-line databases, such as databases 120, 130 gains access to the Internet 150, the temporarily online database 120, 130 transmits all of the data contained in the database 120, 130 to the central database 100. If the off-line database 110 has encountered one of the databases 120, 130 previously, and transmitted data from the off-line database 110, the data contained in the off-line database 110 can reach the central database 100, even if the off-line database 110 never connects to the Internet 150.

Databases 100, 110, 120, 130 are third party software that stores the data objects in persistent storage and retrieves data objects from storage, in response to requests made by the software 105, 115, 125, 135. Various objects may be stored in various databases for reasons such as speed, cost, reliability, or capacity. Database 100, 110 120, 130 may be a flat database, a relational database, a hierarchical database, a nested database, a risk database, or other type of database.

Server software 105 manages the database 100 and communicates with the mobile software applications 115, 125, 135 to send and receive new records and modifications. A single server software 105 manages many projects, forms, and responses, and serves many mobile software applications 115, 125, 135 and users. The server software 105 handles authentication and then grants access to a subset of the projects, forms, and records according to the access granted to the user. The server software 105 enforces that the relationships between data objects stored in database 100 are valid, that logs are associated with correct IDs unique to the whole system, and that the contents of each data object is valid. The server software 105 can store data objects in one or more databases 100. The server software 105 may encrypt data objects before storage. The server software 105 may actually consist of many pieces of software running on many computers that together carry out these functions (for reasons including speed, cost, reliability, or capacity).

Software 115, 125, 135 has a user interface and can run on a mobile device 112, 122, 132, such as a smartphone or tablet. Software 115, 125, 135 can be a mobile device software application. The software 115, 125, 135 can be used by data collectors. Software features include creation of new enrollment records by completing an enrollment form, creation of new longitudinal records by choosing an existing enrollment form and completing a multiple-entry form, modification of existing records, viewing of records, and searching for records. New records and modifications are stored on the device 112, 122, 132.

The software 115, 125, 135 communicates with the server software 105 over a network 150 (for example the internet). When communication to the server is possible, i.e., the devices 112, 122, 132 are "online", new records and edits are transmitted to the server software 105, and the records and edits that are not yet on the device 112, 122, 132 are received from the server. Forms are also received from the server software 105 and stored on the device 112, 122, 132. The software 115, 125, 135 may encrypt records before storage and/or transmission. Users must authenticate with the server software 105 to use the software 115, 125, 135 and thereafter may continue to use the software 115, 125, 135 when offline.

Figure 2:
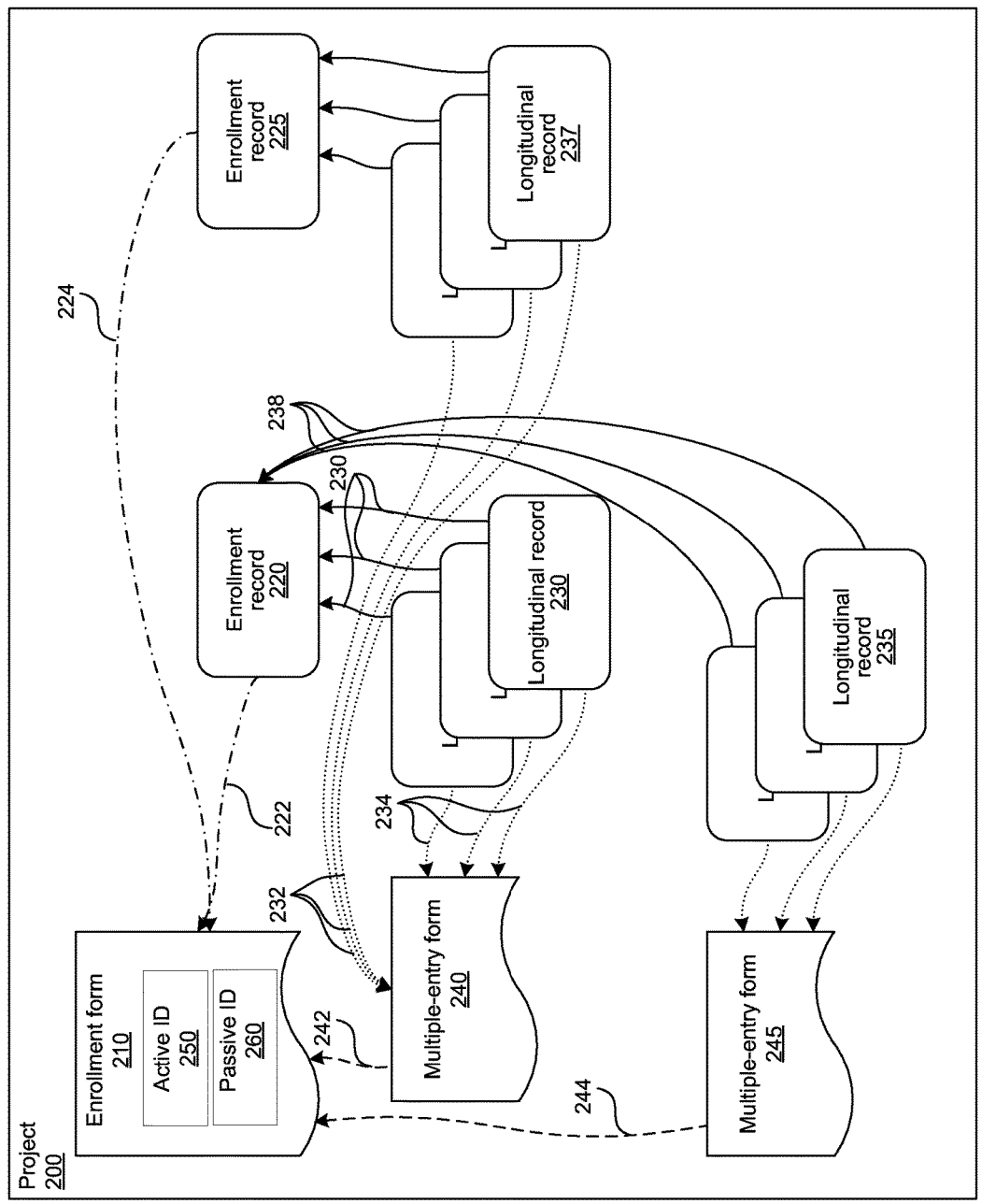
FIG. 2 shows contents of a project stored in a database.

FIG. 2 shows contents of a project stored in any of the databases 100, 110, 120, 130 in FIG. 1. A project 200 contains one or more logs entered by a user. The log can be an enrollment form 210, an enrollment record 220, 225, a longitudinal record 230, 235, 237, a multiple entry form 240, 245. Project 200 contains the logs and isolates them from projects with a different purpose or by a different user. The system supports simultaneous projects on the same server and off-line devices. Each user of the system authenticates to gain access to projects and then chooses the project to collect data for.

A form such as the enrollment form 210, or a multiple entry form 240, 245 defines the data that may be collected, including fields, field types, field categories, a collection order, and conditional logic. Each project 200 contains one or more enrollment forms 210 and one or more multiple-entry forms 240, 245. Each multiple-entry form 240, 245 is associated with one enrollment form 210, which is known as the parent form. Multiple entry forms 240, 245 contain links 242, 244 to the parent enrollment form 210. Multiple entry forms 240, 245 define the queries asked every time the user opens the enrollment form 210 and/or the record 220.

The enrollment form 210 contains at least two identifications (IDs), an active ID 250, and a passive ID 260. The active ID 250 can be entered by the user and can include any form, record, or field associated with the respondent, such as a name, an identification number, region of origin, favorite color, etc. The active ID 250 can vary over time, and can contain conditional elements. The active ID 250 may or may not be unique to the device in which the active ID 250 is entered, or to whole system. The passive ID 260 can be generated by the server 102, or by the devices 112, 122, 132. The passive ID 260 is unique to the device in which is entered, and to the whole system.

A record such as the enrollment record 220, 225, or a longitudinal record 230, 235, 237 contains data collected to satisfy the form 210, 240, 245, including field values and metadata. Each record 220, 225, 230, 235, 237 is associated with one form 210, 240, 245. An enrollment record 220, 225 is associated with an enrollment form 210 through links 222, 224, while the longitudinal record 230, 235, 237 is associated with a multiple-entry form 240, 245 through links 232, 234. Each longitudinal record 230, 235, 237 is associated with an enrollment record 220, 225 through links 236, 238. The enrollment record 220, 225 is known as the parent record, such that the enrollment form 210 of the parent record 220, 225 is the parent form of the multiple-entry form 240, 245 of the longitudinal record 230, 235, 237.

An enrollment record 220, 225 is a collection of data at a single point in time for a particular respondent, i.e., subject or item of interest.

A longitudinal record 230, 235, 237 is a collection of enrollment records 220, 225 over time on the same respondent, i.e., subject or item of interest. The longitudinal records 230, 235, 237 can thus be used to track changes over time. Longitudinal records 230, 235, 237 are an example of a timeseries. For example, the longitudinal record 230, 235, 237 can contain medical vital signs collected hourly for each patient. In this case, the patient is the respondent. In another example, the longitudinal record 230, 235, 237 can include structural condition collected annually for each building. In this case, the building is the respondent. In a third example, the longitudinal record 230, 235, 237 can include resident data collected occasionally for each household. In this case, the household is the respondent.

The user, i.e., a data collector using the software 115, 125, 135 in FIG. 1 on a mobile device 112, 122, 132 in FIG. 1, enrolls a new respondent by completing an enrollment form 210, which results in an enrollment record 220, 225. The new enrollment record 220, 225 is stored on the mobile device 112. The mobile device 112, 122, 132 is offline, which means it is not connected to a network through which the software 115, 125, 135 can communicate with the server software 105 in FIG. 1. The same user may complete a multiple-entry form to collect a longitudinal record for the subject. This process can be repeated to collect more enrollment records 220, 225, which when collected over at least two time points for the same respondent, become longitudinal records 230, 235, 237.

The device 112, 122, 132 can become a server, which means that the device 112, 122, 132 is connected to a network through which it can communicate with the server 102. The software 115, 125, 135 in FIG. 1 detects that the device 112, 122, 132, respectively, has come online and transmits the data contained in the database 110, 120, 130, such as the enrollment record 220, 225 and longitudinal record(s) 230, 235, 237 to the server 102. The server 102 transmits to the device 112, 122, 132 any data such as enrollment records 220, 225 and longitudinal records 230, 235, 237 that are not on the device 112, 122, 132.

Other users using the software 115, 125, 135 on other devices 112, 122, 132 that can access the server 102, can receive the enrollment and longitudinal records 220, 225, 230, 235, 237 from the server software 105. Those users can then complete multiple-entry forms 240, 245 to collect more longitudinal records 230, 235, 237 for the same respondent as described above. In other words, multiple users of the software 115, 125, 135 can collect and enter data for the same respondent, simultaneously, or at different points in time.

Figure 3:
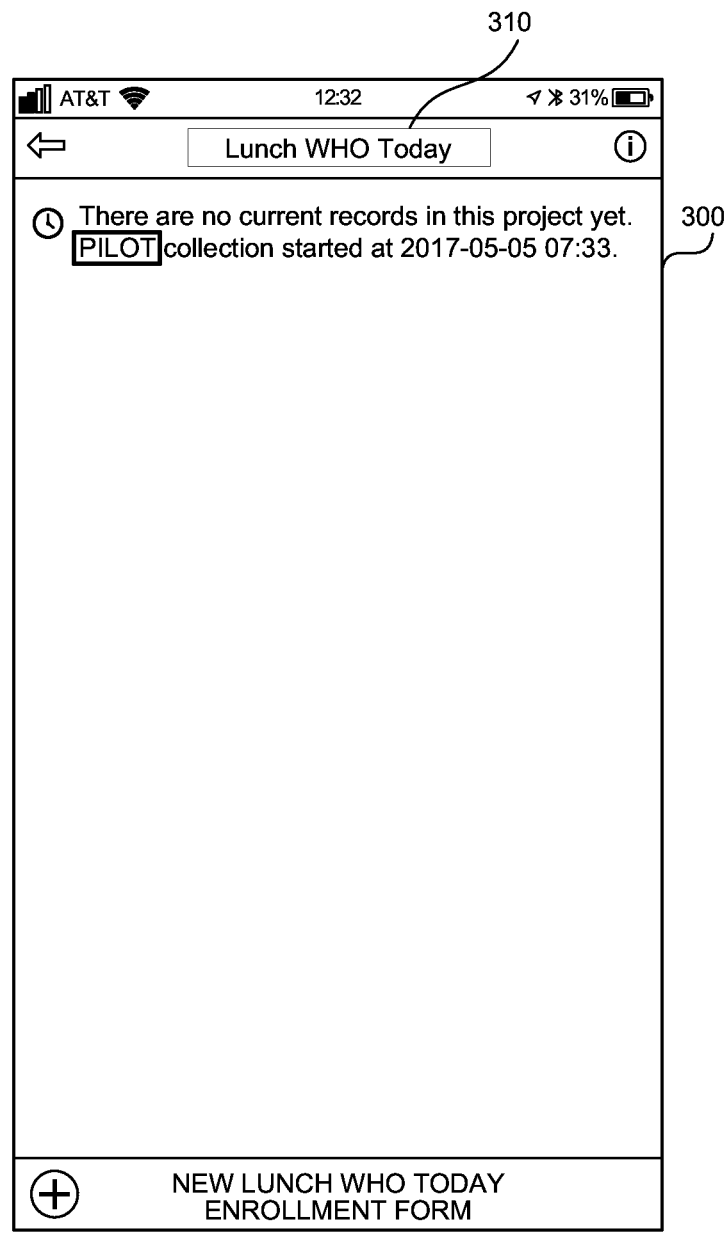
FIG. 3 shows an initialized project displayed on a device.

FIG. 3 shows an initialized project displayed on a device 112, 122, 132 in FIG. 1. Initialized project 300 contains a title 310, but does not contain any records until a user enters respondent data. The project 300 can be initialized on the device 112, 122, 132 and/or the server 102 in FIG. 1, and transmitted to the device 112, 122, 132.

FIG. 4 is an enrollment form associated with the project 300 in FIG. 3. The enrollment form 400 contains multiple enrollment records 410, 420, 430, 440, 450, 460. Each of the enrollment records 410, 420, 430, 440, 450, 460 can contain longitudinal records, i.e., multiple enrollment records at various points in time. Each enrollment record contains a query 422 (only one labeled for brevity) and can contain a list of possible answers 432 (only one labeled for brevity). Each enrollment record 410, 420, 430, 440, 450, 460 can be an active ID, entered by the user. Subsequently, the user that created the enrollment form 400, or another user that has access to the enrollment form 400, can search for the enrollment form 400 using any of the enrollment records 410, 420, 430, 440, 450, 460. The device 112, 122, 132 in FIG. 2 stores the information entered into the enrollment form 500.

In addition, the device 112, 122, 132 in FIG. 2 stores automatically gathered data such as: time when the log (e.g., enrollment form and the records and forms within the enrollment form) are created, location where the data was gathered, the time at which the log was initially opened, the time at which the log was completed, respondent's identity, the project's ID, etc. Using the automatically gathered data, such as the time when the law was initially opened and/or the time at which the log was completed, the device 112, 122, 132 can create a timeseries of multiple answers recorded over a period of time.

Figure 5:
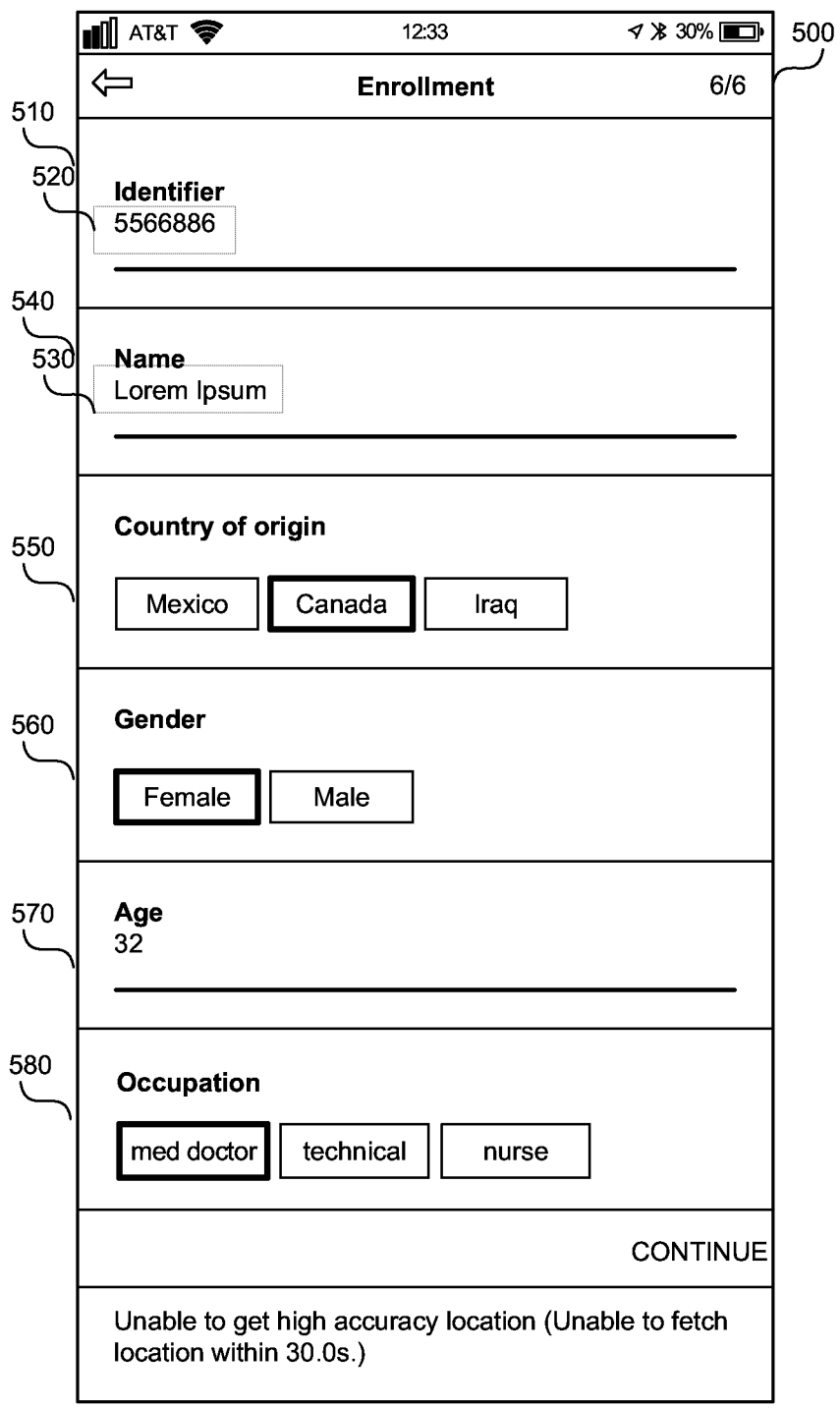
FIG. 5 shows the filled out enrollment form.

FIG. 5 shows the filled out enrollment form. Enrollment form 500 is the filled out enrollment form 400 in FIG. 4. The identifier 510 is the active ID, entered by the user. The identifier 510 can be obtained by, for example, scanning in a barcode ID attached to a parcel or to a patient. In another example, the identifier 510 can be assigned by the user. The device 112, 122, 132 in FIG. 1 stores a log, that is, the enrollment form 500, and the records contained in the enrollment form 500. In addition, the device 112, 122, 132 stores a time when the logs are created, and a time variability associated with the logs, in the database 110, 120, 130, respectively.

The time variability specifies the period of time during which the log is expected to remain unchanged. For example, log 510—ID, log 540—name, and log 560—gender, can have extremely high time variability such as maximum integer associated with the software 115, 125, 135 in FIG. 1, because the identification and the name of a person are not expected to change. Log 580—occupation can have a shorter time variability such as 10 years, because a person's occupation can change. Log 550—country of origin can have a time variability of 5 years. Log 570—age has a time variability of one year, because a person's age changes every year. The time variability of the record can be supplied by the user, or automatically determined based on the respondent's prior history, or prior history of respondents similar to the current respondent. Similar respondents can be people from the same geographical region, or parcels having the same source and destination, etc.

Subsequently, when the user that created the enrollment form 500, or another user that has access to the enrollment form 500, wants to find the enrollment form 500, the user can enter the value 520 of the identifier 510, or the user can enter the value 530 of the log 540, e.g., the name of the respondent. If there are multiple logs matching the entered value within the database 110, 120, 130 in FIG. 1, the software 115, 125, 135 in FIG. 1 can display all the logs matching the entered value stored within the database 110, 120, 130, respectively. By examining additional records associated with the logs, the user can disambiguate between multiple matching logs, and select a single log as the desired log.

Figure 6:
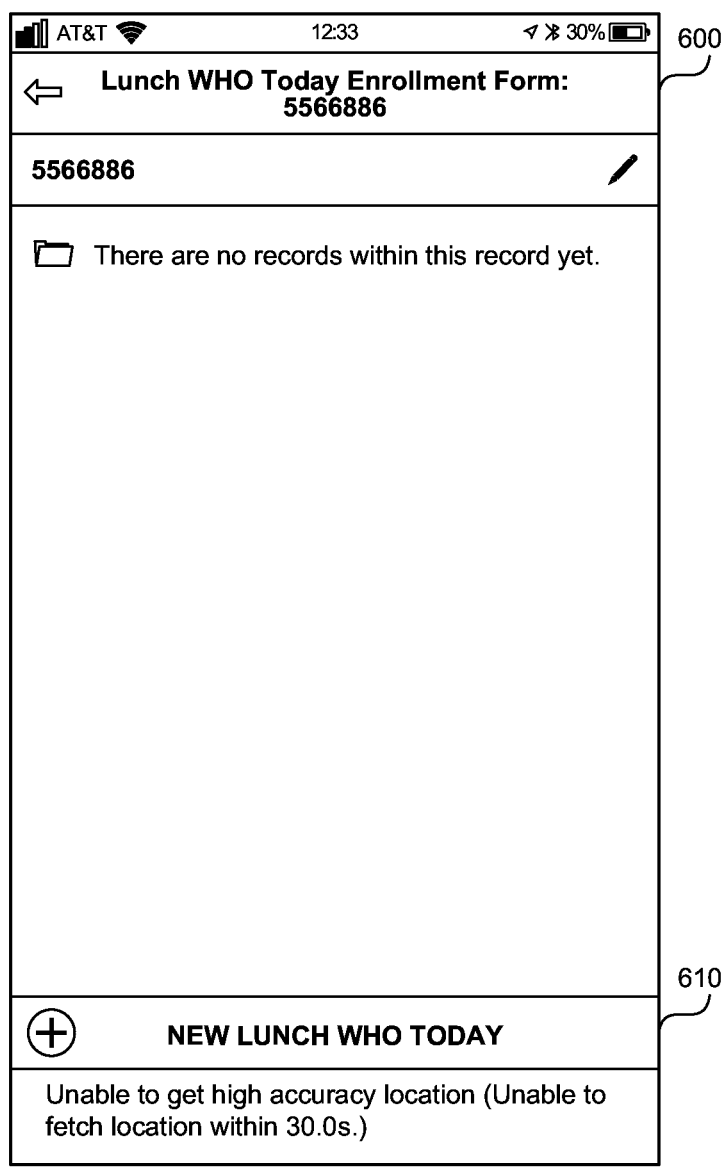
FIG. 6 shows a user interface enabling a user to add additional records to an existing entry form.

FIG. 6 shows a user interface enabling a user to add additional records to an existing entry form. User interface element 600 shows information regarding the enrollment form 500 in FIG. 5, that the user can edit. The user interface elements 600 can show information regarding the enrollment form 500, such as the title of the project and the ID of the respondent. By selecting user interface element 610, the user can add additional logs to the enrollment form 500.

Figure 7:
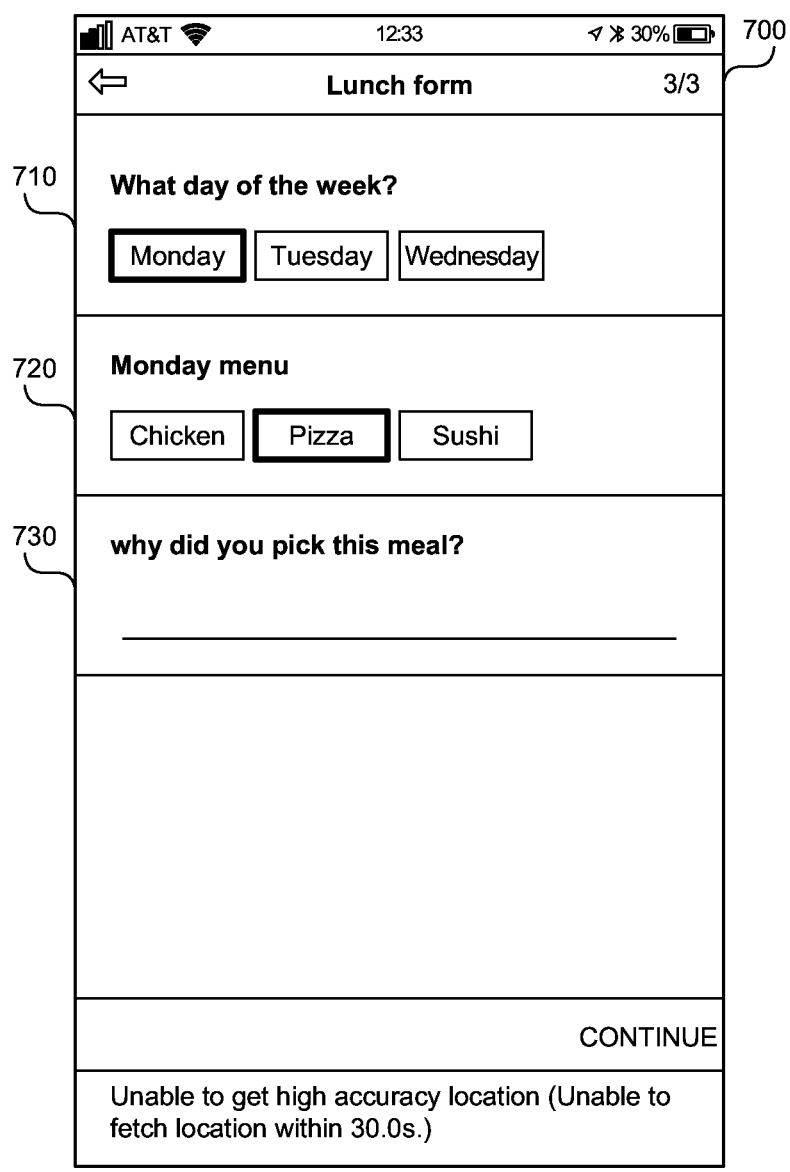
FIG. 7 shows a multiple entry form associated with the enrollment form.

FIG. 7 shows a multiple entry form associated with the enrollment form 500 in FIG. 5. The multiple entry form 700 contains multiple records 710, 720, 730. Each record contains a question, and can contain a possible list of answers. A timeseries of the answers to the questions ordered by time of entry forms a longitudinal record.

The device 112, 122, 132 in FIG. 1 stores a log, that is, the multiple entry form 700 and the records 710, 720, 730 contained in the multiple entry form 700. In addition, the device 112, 122, 132 stores a time when the logs are created, and a time variability associated with the logs, in the database 110, 120, 130, respectively.

The time variability specifies the period of time during which the log is expected to remain unchanged. For example, log 710—day of the week has a time variability of one day, because day of the week changes daily. Log 720—menu can have a time variability of the week. The time variability of the log 720 can be obtained by querying the restaurant on how frequently the menu is changed. Log 730—reasons for meal selection can have a time variability of 3 hours. The time variability of the record can be supplied by the user, or automatically determined based on the respondent's prior history, or prior history of respondents similar to the current respondent. Similar respondents can be people from the same geographical region, or parcels having the same source and destination, etc. Logs with longer time variability are better IDs than logs with a shorter time variability.

Figure 8:
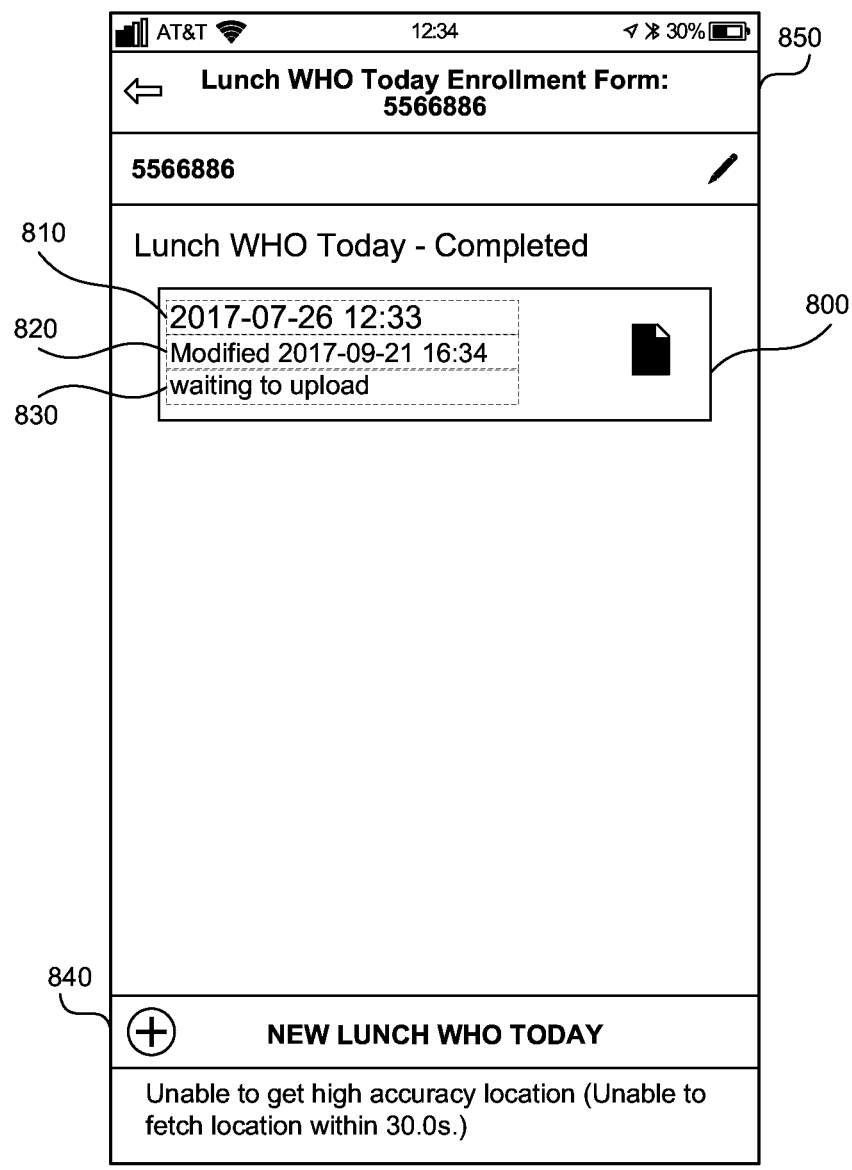
FIG. 8 shows a project containing a completed enrollment form.

FIG. 8 shows a project containing a completed enrollment form. The database 110, 120, 130 in FIG. 1 stores the project 850 containing the completed enrollment form 800 along with an indication 810 of a time the enrollment form 800 was created, an indication 820 of the last time the enrollment form 800 was edited, and an indication 830 of whether the updated enrollment form 800 has been uploaded to the central database 100. Through the user interface element 840, the user can add a new log, such as a new enrollment form, new enrollment record, and/or a new multiple entry form to the project 850 and/or the enrollment form 800.

Figure 9:
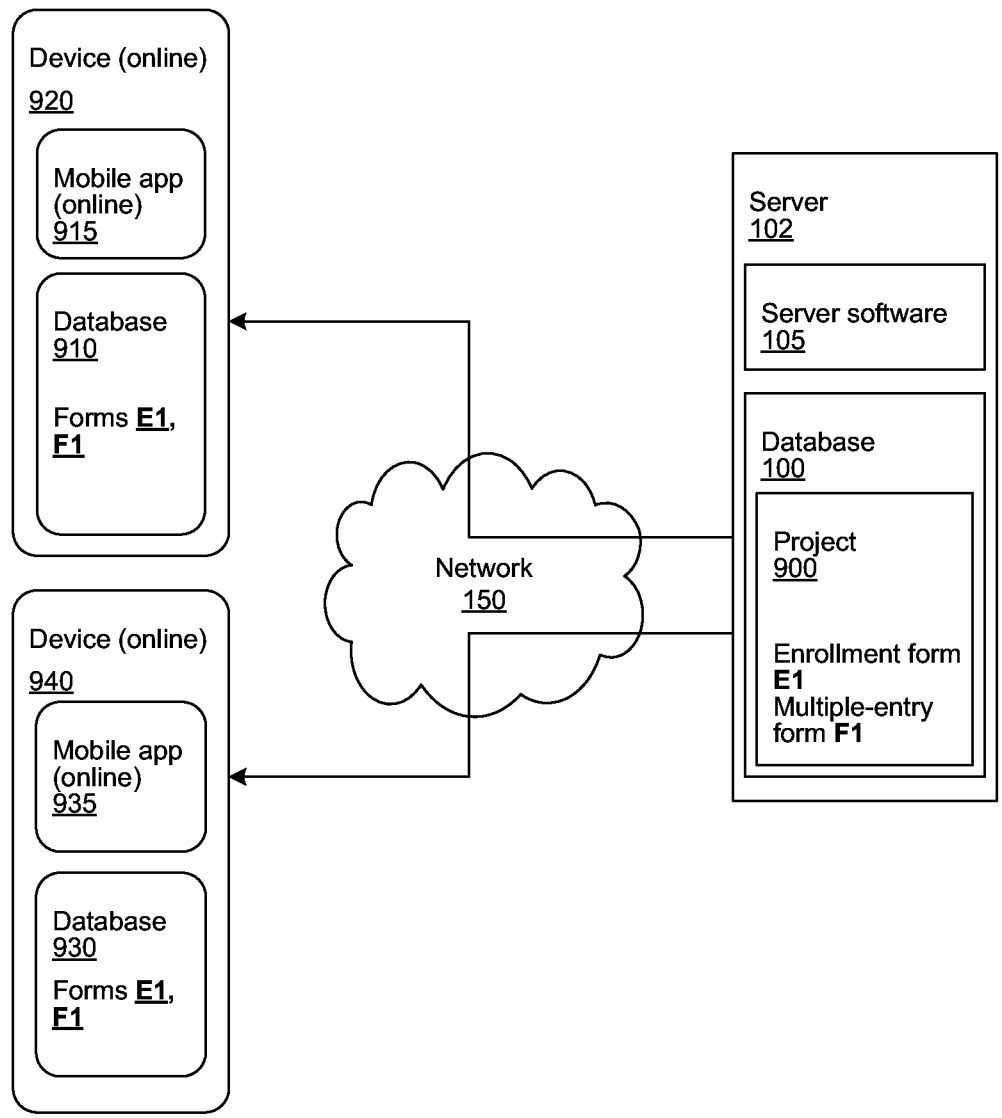
FIG. 9 shows information exchanged between two devices and a server.

FIG. 9 shows information exchanged between two devices and a server. The server software 105 running on the server 102 and multiple mobile software applications 915, 935 running on mobile devices 920, 940 can exchange information between each other over the network 150. The server 102 contains many projects, including project 900 which contains enrollment form E1 and multiple entry form F1.

Initially, software applications 915, 935 are online and a user enters authentication credentials on each. The software application 915, 935 confirms authentication against the server software 105, and begins an authenticated session. The server software 105 determines that each user has access to project 900, and transmits E1 and F1 to software applications 915, 935.

Figure 10:
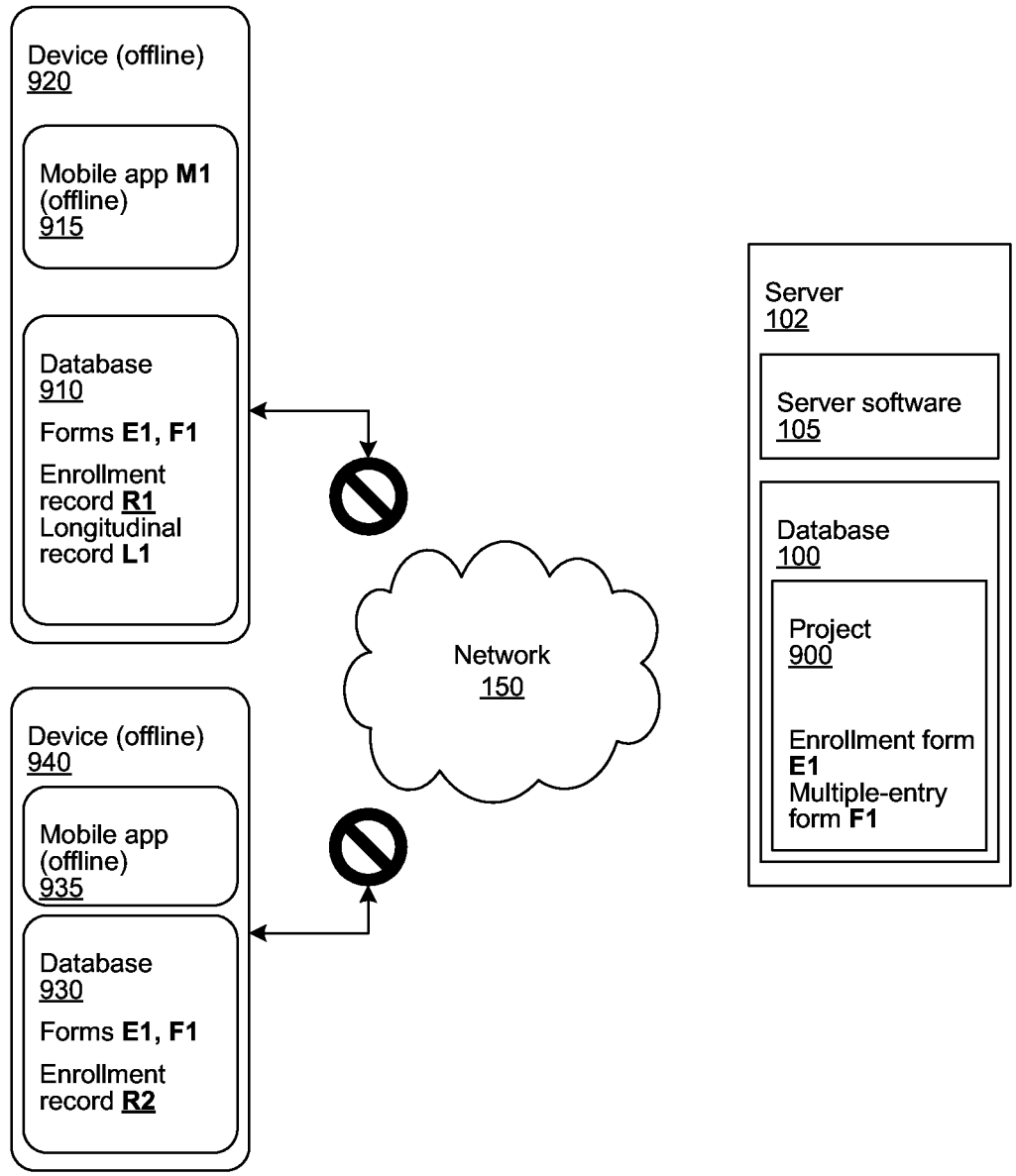
FIG. 10 shows state of the devices after losing connection to the network 150.

FIG. 10 shows state of the devices 920, 940 after losing connection to the network 150. Even after the software applications 915, 935 lose connection to the network, the applications 915, 935 allow the user to continue use of the applications 915, 935 based on the last authentication. Additionally, the applications 915, 935 allow users to add new records, edit existing records in the databases 910, 930 etc., when the mobile devices 920, 940 are fully off-line. For example, the user completes form E1 in application 915, producing enrollment record R1. The user then completes F1, selecting R1 as the parent, producing longitudinal record L1. The user completes form E1 in application 915, producing enrollment record R2. When the user adds a new record, the software applications 915, 935 inputs a new relational schema set object which creates a new row and column across several tables. When the user adds to an existing record, the software applications 915, 935 inputs new relational schema set object to an existing schema set object by editing a row and column across several tables.

Figure 11:
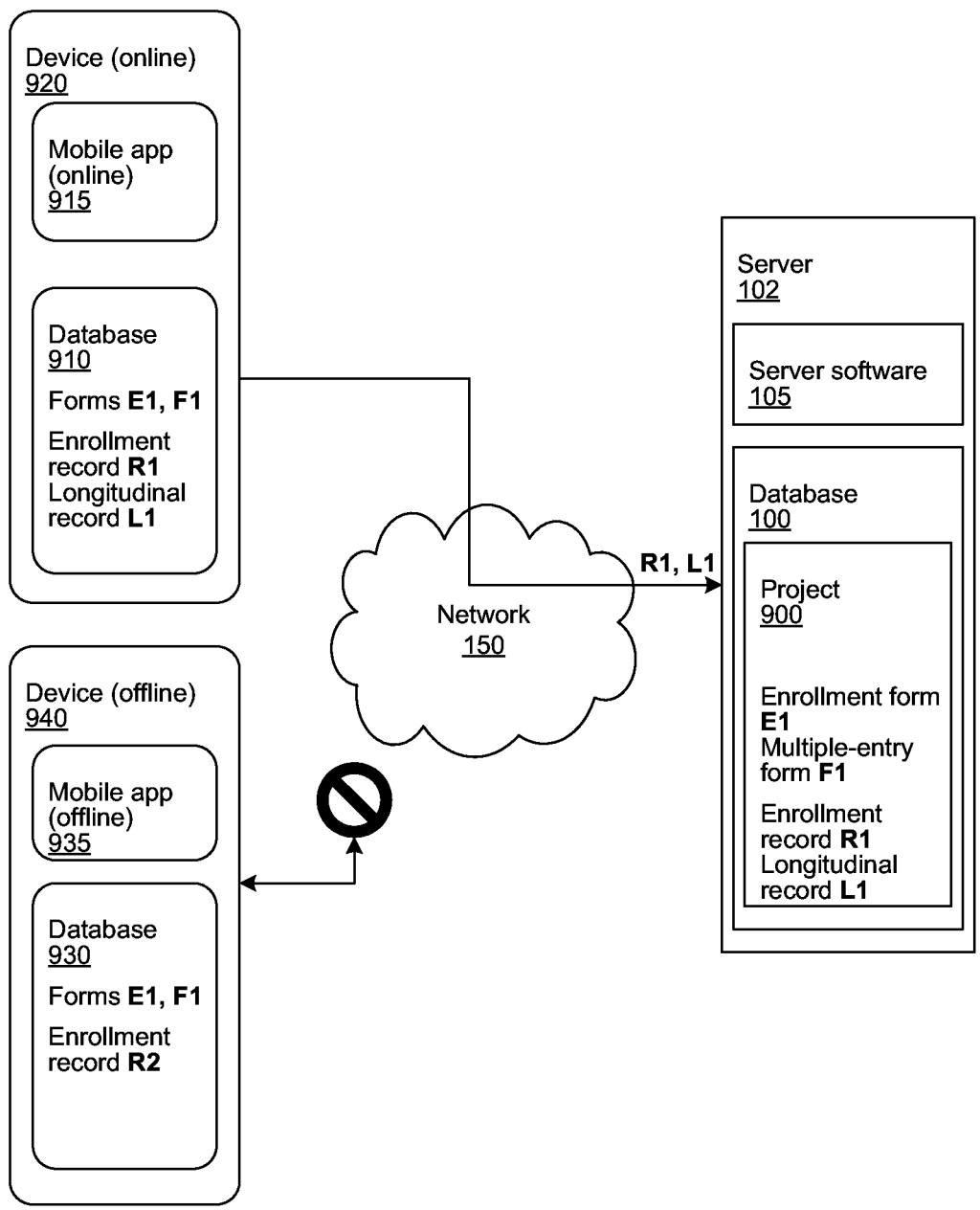
FIG. 11 shows states of the devices and server after application gains connection to the network.

FIG. 11 shows states of the devices 920, 940 and server 102 after application 915 gains connection to the network 150. After application 915 comes online, the application 915 transmits R1 and L1 to server 102. The central database 100 now contains enrollment form E1, multiple entry form F1, along with the enrollment record R1 and the longitudinal record L1.

Figure 12:
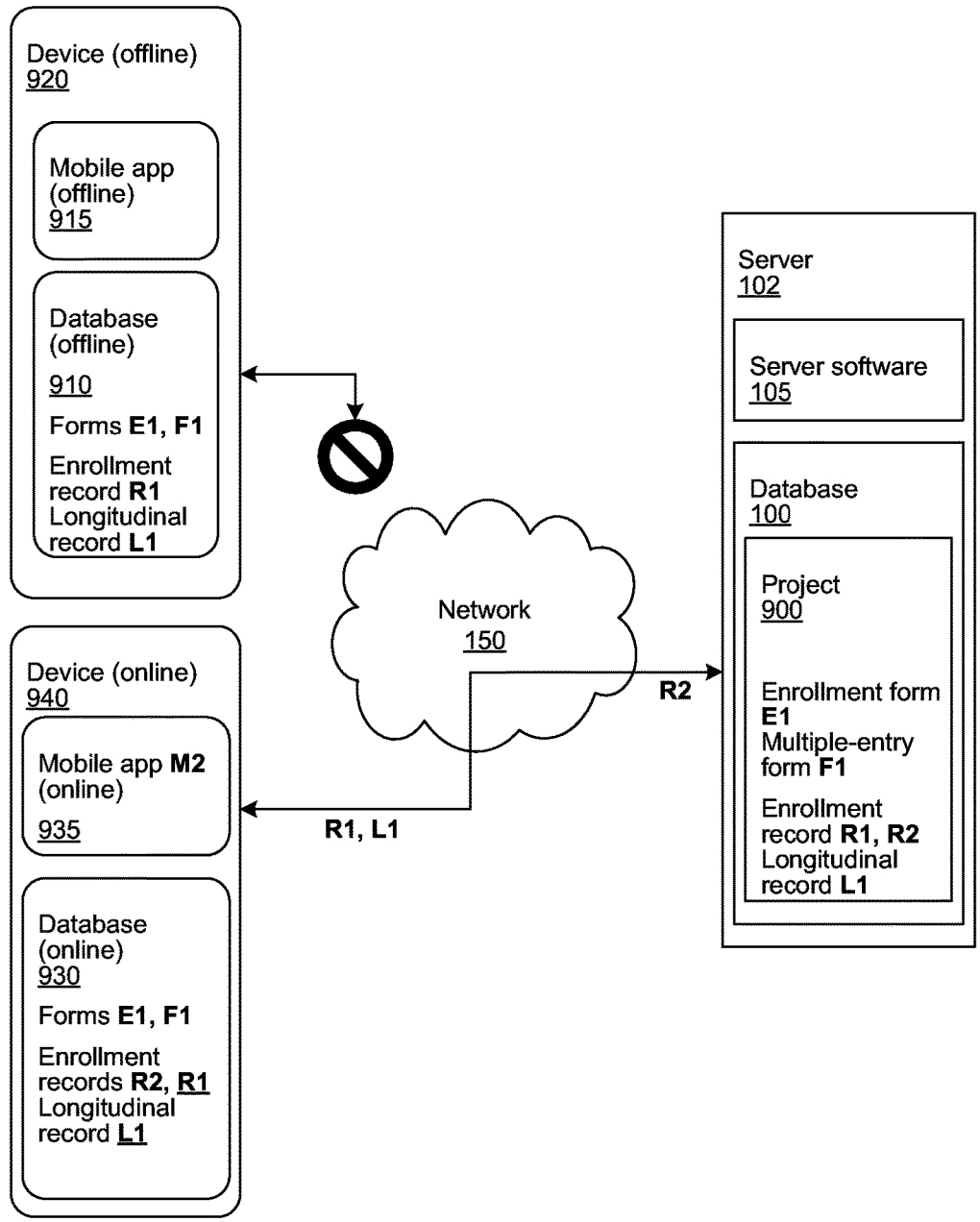
FIG. 12 shows states of the devices and server after one application loses connection to the network, and another application gains connection to the network.

FIG. 12 shows states of the devices 920, 940 and server 102 after application 915 loses connection to the network 150, and application 935 gains connection to the network 150. Software application 915 becomes offline and software application 935 becomes online. Software application 935 transmits R2 to server 102 and server 102 transmits R1 and L1 to software application 935.

Figure 13:
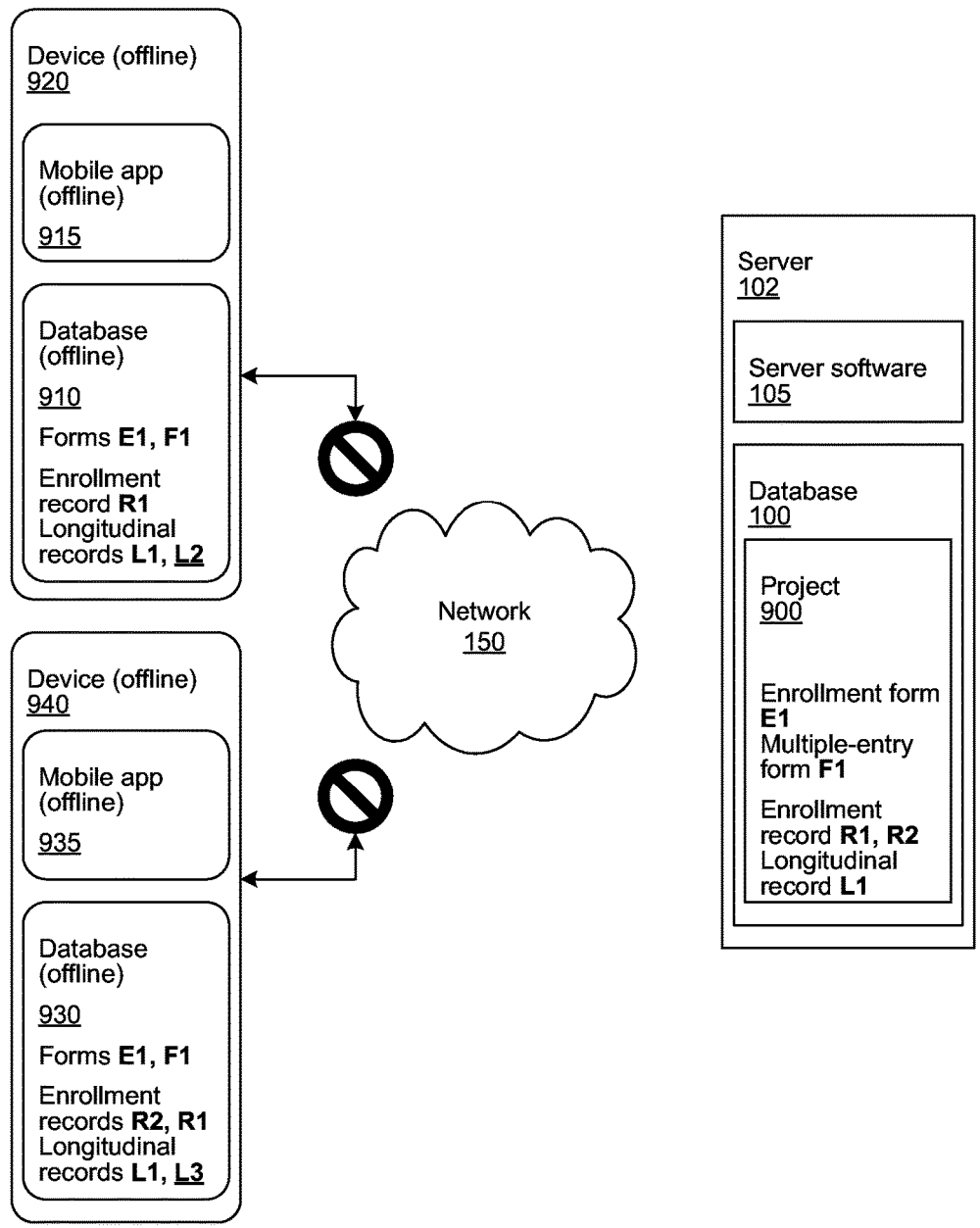
FIG. 13 shows states of the devices and server after applications lose connection to the network.

FIG. 13 shows states of the devices 920, 940, and server 102 after applications 15, 935 lose connection to the network 150. Application 935 becomes offline. Now in application 915, the user completes F1, selecting R1 as the parent, producing longitudinal record L2. Meanwhile in application 935, the user completes F1, selecting R1 as the parent, producing longitudinal record L3. Both users are adding a longitudinal record to the same enrollment record, when both of the devices 920, 940 are off-line.

The databases 910, 930 store the time at which records L2 and L3 have been recorded, so that when the databases 910, 930 are synchronized, the records L2, L3 can be ordered according to the time at which they were recorded. The users have added longitudinal records L2, L3 to an existing record R1. The applications 915, 935 input new relational schema set object for time of edit, while the pre-edited response variables across multiple schemas remain in place from previous time periods, thus preserving all the previously entered data without a risk of overwriting and/or deleting the older data.

Figure 14:
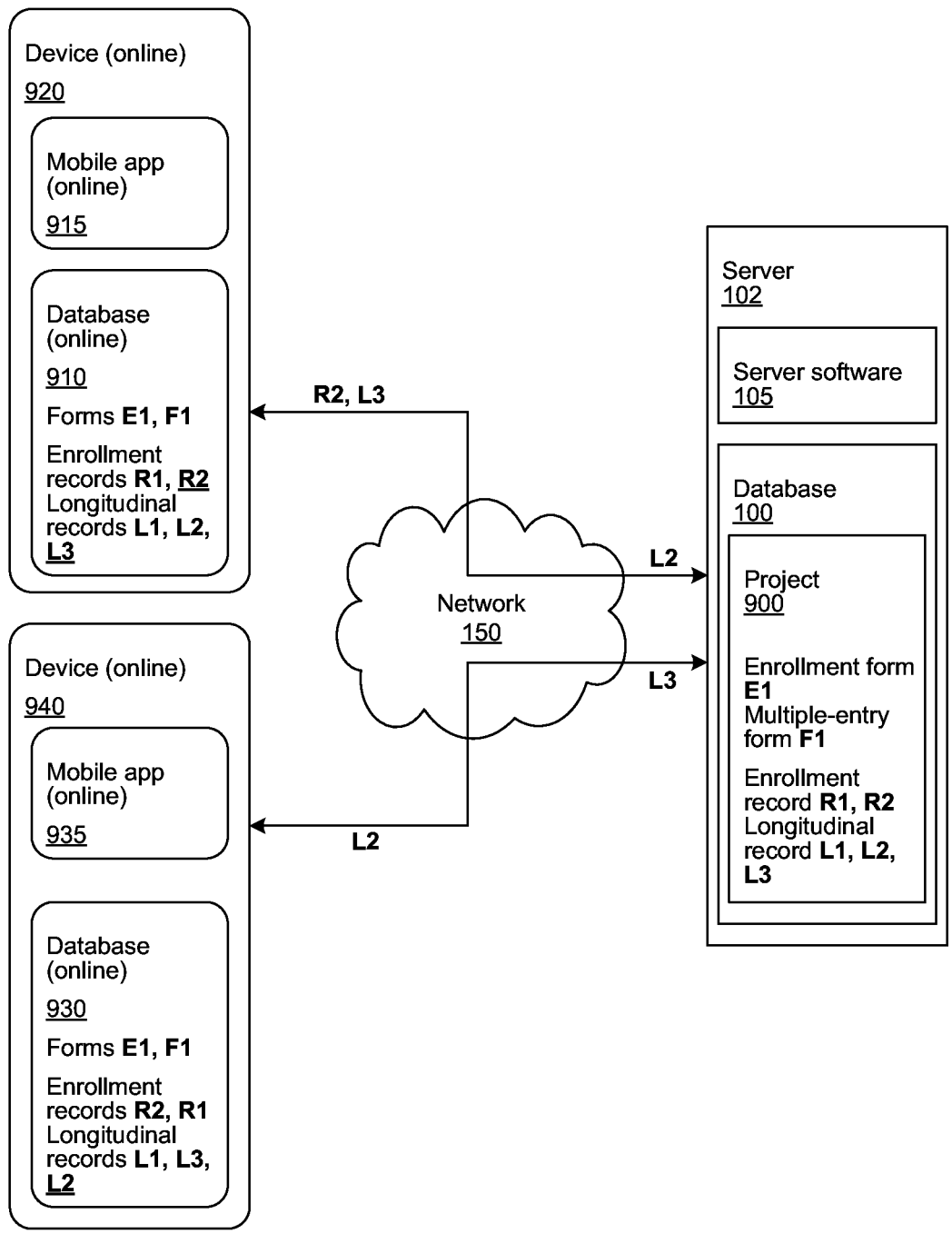
FIG. 14 shows states of the devices and server after applications gain connection to the network.

FIG. 14 shows states of the devices 920, 940, and server 102 after applications 915, 935 gain connection to the network 150. Both applications 915, 935 become online. Application 915 transmits L2 to the server 102. Application 935 transmits L3 to the server 102. The server software 105 arranges the received records L2 and L3 according to the timestamps received from the applications 915, 935, respectively.

The server 102 then transmits L2 to application 935 and R2 and L3 to application 915. Both devices 920, 940 now contain the same records. Collection and transmission continues in the same way as records are created and modified and each application 915, 935 alternates between offline and online.

Figure 15:
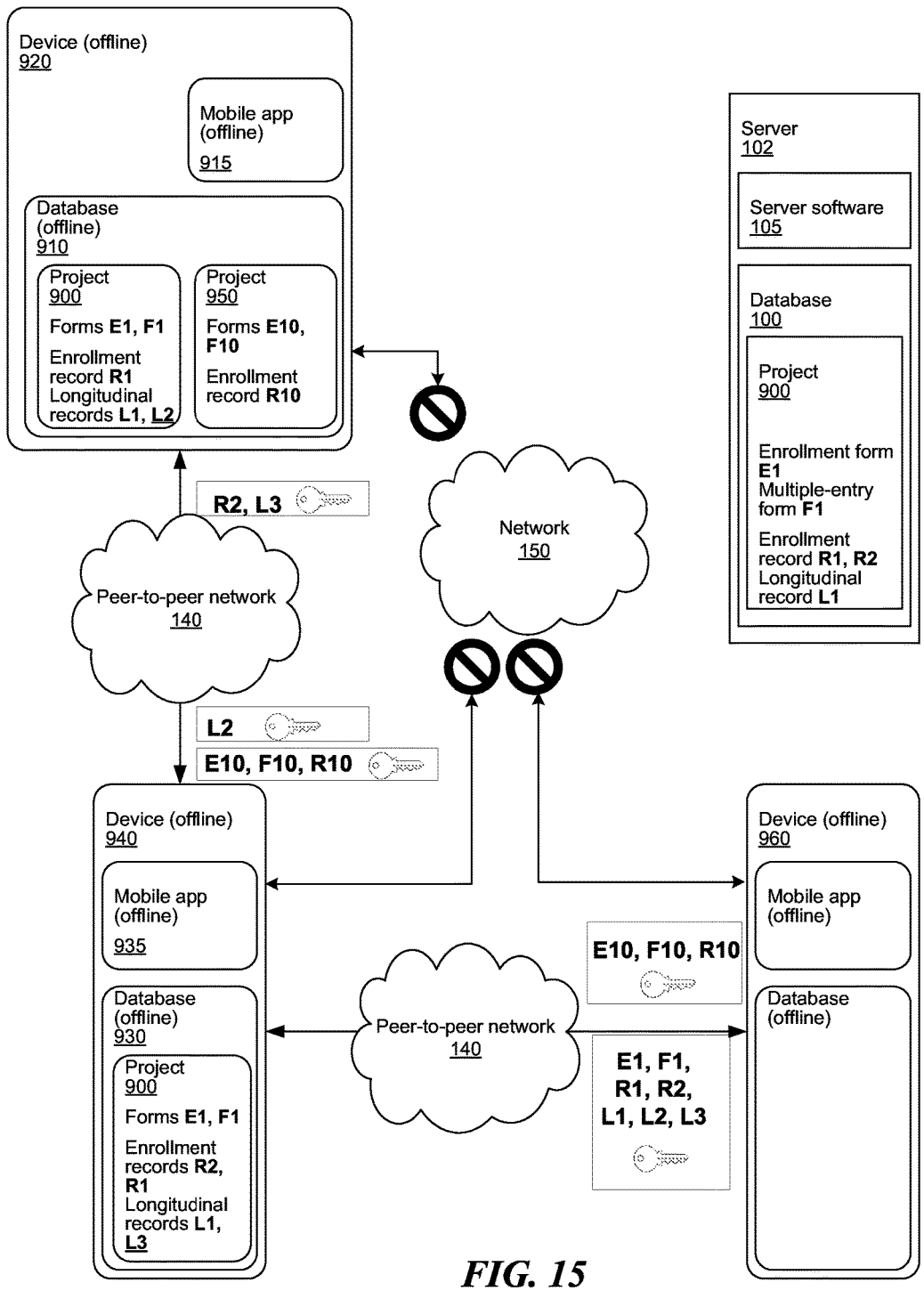
FIG. 15 shows the two devices communicating with each other over a peer-to-peer network.

FIG. 15 shows the two devices 920, 940 communicating with each other over a peer-to-peer network. Even when the communication over the network 150 with the server 102 cannot be established, the two devices 920, 940 can communicate directly with each other using a peer-to-peer network such as a mesh network, cellular network, short range network such as Bluetooth, etc. The devices 920, 940 need to be within 10 m of physical proximity and have the applications 915, 935 running, respectively.

For example, the user of the device 920, at time T1, captures information from respondent (person, parcel, etc.) once or in series. The device 920, at time T1, stores information across relevant tables in the offline application-enabled relational database 910. The user, at time T2, can view all records across application when user encounters users of other devices 940 who have been using the same application 935 with the same permissions. User devices 920, 940 must be within 10 m of physical proximity and have applications 915, 935 running. The device 920, at time T2, shares information with permission-enabled devices 940 within 10 m radius (with applications 915, 935 running) passively and automatically when proximity has been breached. In the present case, device 920 sends records L2 to device 940, while device 940 sends records R2, L3 to device 920.

In another example, each project 900 within the application 915, 935 has a unique security key that is used to encrypt responses so that they can become a part of the mesh fabric.

Device 920 collects responses on project 950. Device 920 encounters device 940 that has access to project 900, and no access to project 950. Device 920 transmits responses L2 encrypted with the project 900 key, and responses E10, F10, R10 encrypted with the project 950 key to device 940. Device 940 can decrypt project 900 responses, but cannot decrypt project 950 responses. Device 940 shares responses to project 900 with device 920, which device 920 can decrypt.

Device 940 encounters device 960, and the two devices 940, 960 synchronize. Device 960 gets encrypted responses from project 900 and project 950. Since device 960 has access to project 950, device 960 is able to decrypt and use responses E10, F10, R10. Device 960 does not have access to project 900, and responses E1, F1, R1, R2, L1, L2, L3 remain encrypted on the device 960.

Figure 16:
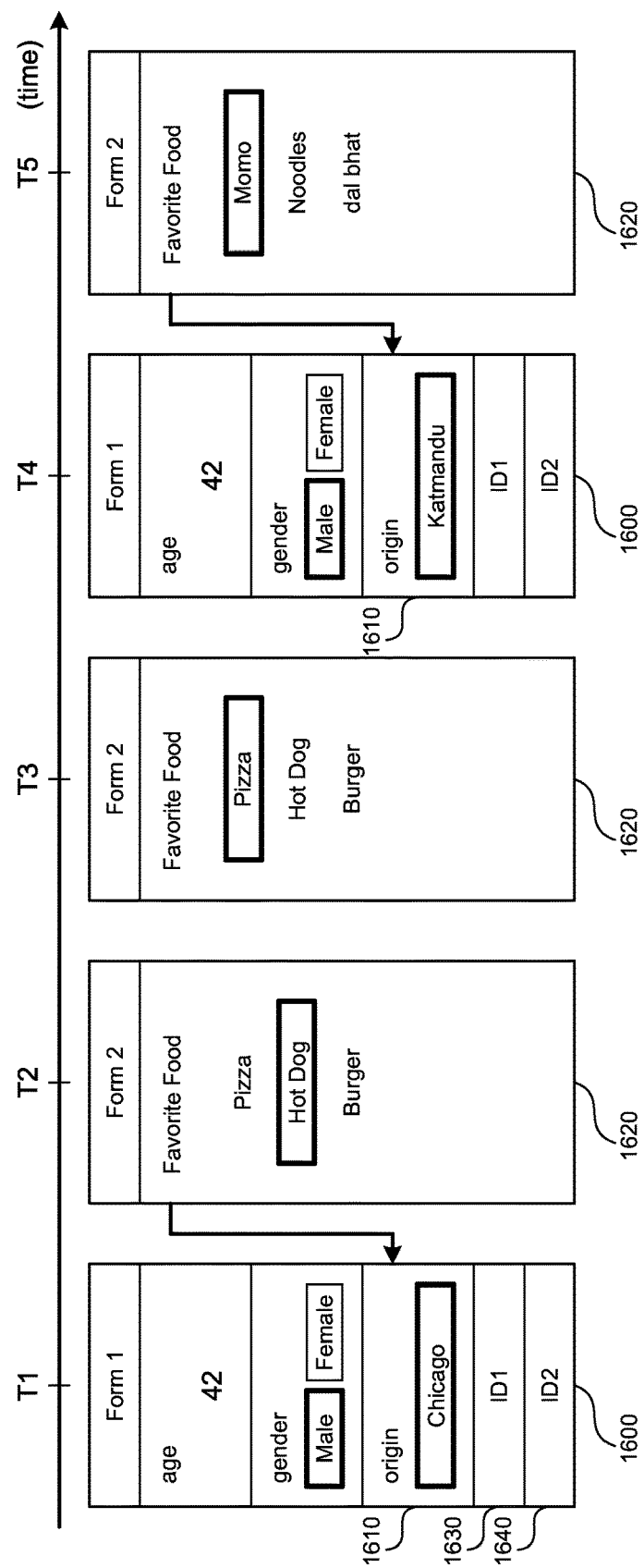
FIG. 16 shows creation and editing of dependent logs.

FIG. 16 shows creation and editing of dependent logs. A log can be an entry form, a multiple entry form, enrollment record, longitudinal record, etc. An entry form 1600 contains multiple records pertaining to various respondent attributes. Parent log 1610 has a dependent log 1620, where the value of the dependent log 1620 depends on the value of the parent log 1610.

For example, parent log 1610 can ask for the city of origin of respondent. The dependent log 1620 can ask for the respondent's favorite food, which depends on the respondent city of origin. The dependent log 1620 can be prepopulated with likely values based on the value of the parent log 1610. In a more specific example, if the respondent is from Chicago, the respondent's favorite food is likely to be a pizza, a hot dog, a burger. The likely choices for the favorite food can be based on the data already in the database where the top three choices for favorite food of people from Chicago are pizza, hot dog, burger.

At time T1, the user enters information of the respondent into the entry form 1600. At time T2, the user enters information of the respondent into the dependent log 1620. As time T3, the user edits the value of the dependent log 1620, based on changing respondent preferences. The system stores both the value of dependent log 1620 at time T2, and value of the dependent log 1620 at time T3. At time T4, the user edits the value of the parent log 1610 to change the respondent city of origin. The system automatically detects that the parent log 1610 has a dependent log 1620, and provides the user with a questionnaire containing most likely values for the dependent log 1620 based on the changed value of the parent log 1610. In FIG. 16, the favorite food is updated to show most likely choices for respondents from Kathmandu. At time T5 the user can select one of the multiple choice is provided, or can enter a new value. The system stores the values of dependent log 1620 at time T2, T3, and T5, without overwriting any of the values. The timeseries T2, T3, T5 of the dependent log 1620 is an example of a longitudinal record.

In addition, the entry form 1600 contains at least two identifications, 1630, 1640. Every log in the system can contain two identifications. One identification (ID) is a passive ID 1630, generated by the system, while the other ID is an active ID 1640 provided by the user. The active ID 1640 can be entered by the user and can include any form, record, or field associated with the respondent, such as a name, an identification number, region of origin, favorite color, radio frequency ID, barcode ID, etc. The active ID 1640 can vary over time, and can be the parent log 1610, such as the city of origin, or the dependent log 1620, such as the favorite food. The active ID 1640 may or may not be unique to the device in which the active ID 1640 is entered, or to whole system.

The passive ID 1630 can be generated by the server 102 in FIG. 1, or by the devices 112, 122, 132 in FIG. 1. The passive ID 1630 is unique to the device in which is entered, to the central database 100 in FIG. 1, and to the whole system. To uniquely identify each log across the system, the log is assigned a unique passive ID 1630. Since a log can be created while the device 112, 122, 132 is offline, the server 102 cannot supply the log ID 1630, nor verify that the ID 1630 is unique. Instead, the log ID 1630 is generated by the mobile application 115, 125, 135 in FIG. 1. The ID 1630 can be a combination of the device ID, the POSIX time when collection of the log started, and a large random number. The large random number can contain 10 digits or more. The probability of two of these log IDs being equal is tiny. The device ID can be of a combination of the POSIX time when the software application 115, 125, 135 first started and a large random number.

In another example, a large number of unique IDs, such as 10,000 unique IDs, can be assigned to a user logging into the mobile application 115, 125, 135. Every time a new respondent is created, or a new log is entered, one of these unique IDs is assigned to the respondent or the log.

Figure 17:
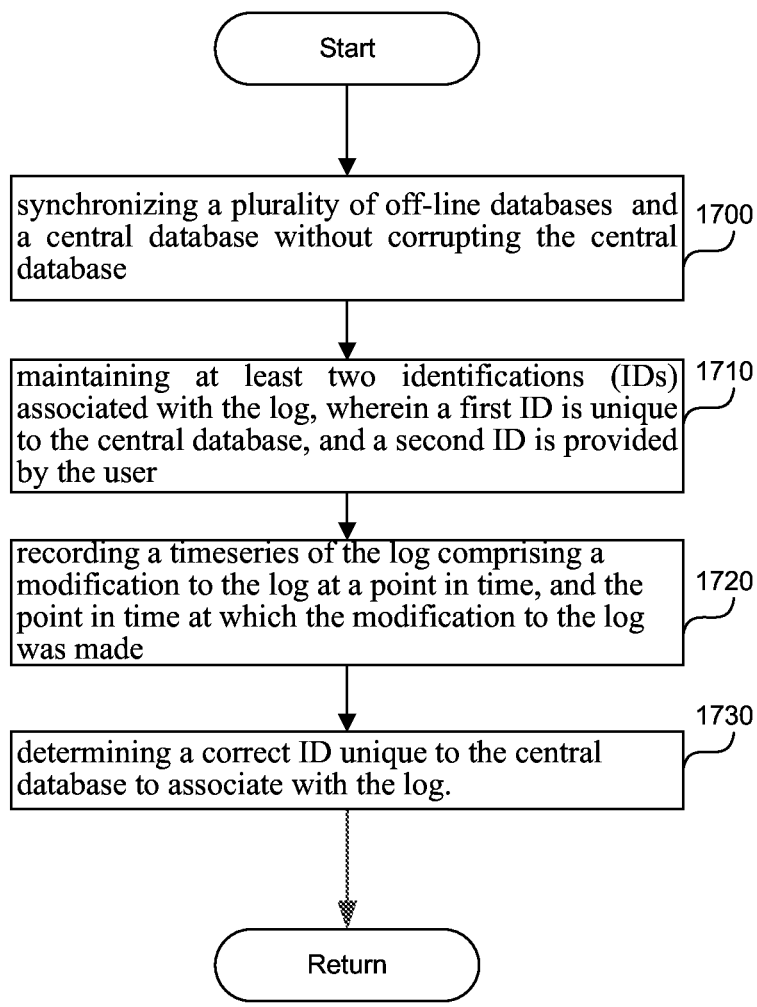
FIG. 17 is a flowchart of a method to maintain a central database associated with a server using a plurality of off-line databases associated with a plurality of off-line devices.

FIG. 17 is a flowchart of a method to prevent corruption of a central database associated with a server using multiple off-line databases associated with multiple off-line devices. In step 1700 a processor synchronizes multiple off-line databases associated with multiple off-line devices and a central database associated with a server without corrupting the central database by incorrectly associating a log entered by a user into an off-line database with an incorrect identification (ID). Corrupting the central database can be done by creating duplicate logs for the same respondent, or creating same log for different respondents. A log can be enrollment form, enrollment record, longitudinal record, and/multiple entry form.

To synchronize the databases, in step 1710, the processor maintains at least two identifications (IDs) associated with the log. The first ID is unique to the central database, and the second ID is provided by the user, as described in this application. The log can include at least one record, and the record can include at least one of a name, an age, a gender, a region of origin, a barcode ID, a favorite food, and/or a radio frequency ID. The log entered by the user can be the second ID.

To generate the first ID, the processor can generate a large random number of 10 digits or more. The processor then combines a device ID, a time when collection of the log started, and the large random number. The first ID is a combination of the device ID (which is of a combination of the POSIX time when the database was initiated on the device with a large random number), the POSIX time when collection of the record started, and a large random number. The probability of two of these record IDS being equal is tiny.

To synchronize the databases, in step 1720, the processor records a timeseries of the log including a modification to the log at a point in time, and the point in time at which the modification to the log was made. In step 1730, the processor determines a correct ID unique to the central database to associate with the log by comparing a time variability of the log specifying the period of time during which the log is expected to remain unchanged, the timeseries of the log and data contained in the central database.

To determine the correct ID, the processor can create a new respondent when two different respondents have mistakenly been recorded in the same log. The log can include multiple records, such as a timeseries of longitudinal records. To determine the correct ID unique to the central database the processor can retrieve from a second off-line database a second log associated with the first ID. The second log includes a second multiplicity of records, that should be associated with a different ID. The second off-line database can be the central database or a second off-line database. Based on the multiple records, the processor formulates a criterion indicating whether the log and the second log are the same, and should be associated with the same ID. By comparing the multiple records of the log and the second log, the processor determines that the criterion is not satisfied, which means that the log and the second log should be associated with different IDs. Finally, the processor associates the log with a third ID unique to the central database. The third ID is the correct ID unique to the central database, and the third ID and the first ID are different.

To formulate the criterion, the processor creates a prioritized list of records. The prioritized list of records is created based on the multiple records and a time variability associated with each record in the multiple records, such that a record least likely to change over time is at the top of the prioritized list of records. For example, gender of the respondent can be at the top of the list because gender of the respondent tends not to change with time, followed by country of origin because country of origin changes infrequently, followed by age of the respondent because the age changes once a year, followed by favorite food changes because favorite food can change monthly. The processor can formulate the criterion to state that when at least one record at the top of the prioritized list is different between the log and the second log, the log and the second log are different. For example, the criterion can state if the gender of the two respondents is different, the two respondents are different.

To determine the correct ID the processor can recognize that two different IDs are associated with the same respondent, and combine the two different IDs into a single ID. The log can include multiple records. The processor retrieves from a second off-line database a second log associated with a third ID, the second log including a second multiplicity of records. Based on the multiple records, the processor formulates a criterion indicating that the log and the second log are the same. Upon determining that the criterion is satisfied, i.e., that the log and the second log belong with the same respondent, the processor associates the log and the second log with the same ID. The same ID can be the first ID unique to the central database.

To formulate the criterion, the processor determines that a record in the multiple records and a corresponding record in the second multiplicity of records correspond to each other. To determine the correspondence, the processor can determine that the record and the corresponding record ask the same question of the respondent. The correspondence between the multiple records and the second multiplicity of records can be one-to-one, or a certain percentage of the records match, such as 60% of the records. The processor determines a time variability associated with the record in the multiple records and the corresponding record in the second multiplicity of records. The time variability specifies a time period during which the record and the corresponding record are expected to remain unchanged. For example, name of the respondent can be at the top of the list because name of the respondent tends not to change with time, followed by gender of the respondents because gender tends not to change over time, followed by country of origin because country of origin changes infrequently, followed by age of the respondent because the age changes once a year, followed by favorite movie changes because favorite movie can change monthly, followed by blood pressure because blood pressure can change hourly. The processor can retrieve a time when the record was entered and a second time when the corresponding record was entered. The processor formulates the criterion to state that when a predetermined number of records between the multiple of records and the second multiplicity of records match, the log and the second log are the same.

To determine that the criterion is satisfied, the processor can determine that the time when the record was entered and the second time when the corresponding record was entered are within the time period during which the record and the corresponding record are expected to remain unchanged. The processor can sum all the records that match, and if at least 90% of the records match, the first and the second correspondent are the same. For example, if the name, the gender, and country of origin are the same, the age of the two respondents was taken within 6 months of each other and the age is the same, and the favorite movie of the two respondents was taken within two weeks of each other and is the same, the two respondents are the same.

When the processor of a device, which can be either online, or off-line, detects a presence of a second device within 10 m, the device synchronizes the database on the device with a second database on the second device. To synchronize, the device receives encrypted multiple records from the second database. Upon determining that the user associated with the device has access to the encrypted multiple records, the processor decrypts the encrypted second multiplicity of records, and synchronizes the multiple records with the database.

When the processor of the device detects an availability of an Internet connection, the processor synchronizes a database on the device with the central database. The Internet connection can include mesh network, Wi-Fi, cellular network, LAN, etc.

To synchronize modifications to the same longitudinal record, i.e., timeseries, by different devices, the processor receives from at least two off-line databases multiple modifications to the log. The notification to the log can include a value and a time at which the value was entered. The processor records the timeseries of the log, which orders multiple modifications to the log from oldest to most recent.

The processor can automatically correct data entered by the user. For example, the processor can smooth out high-frequency log values entered by the user by performing a low-pass filter on the timeseries of the log. In addition to, or alternatively, the processor can correct the timeseries of the log by analyzing changes in the log over time, and remove a value of an abnormal log significantly different from values of the abnormal log's temporal neighbors. Temporal neighbors can be values surrounding the abnormal log value over one or more time periods.

Figure 18:
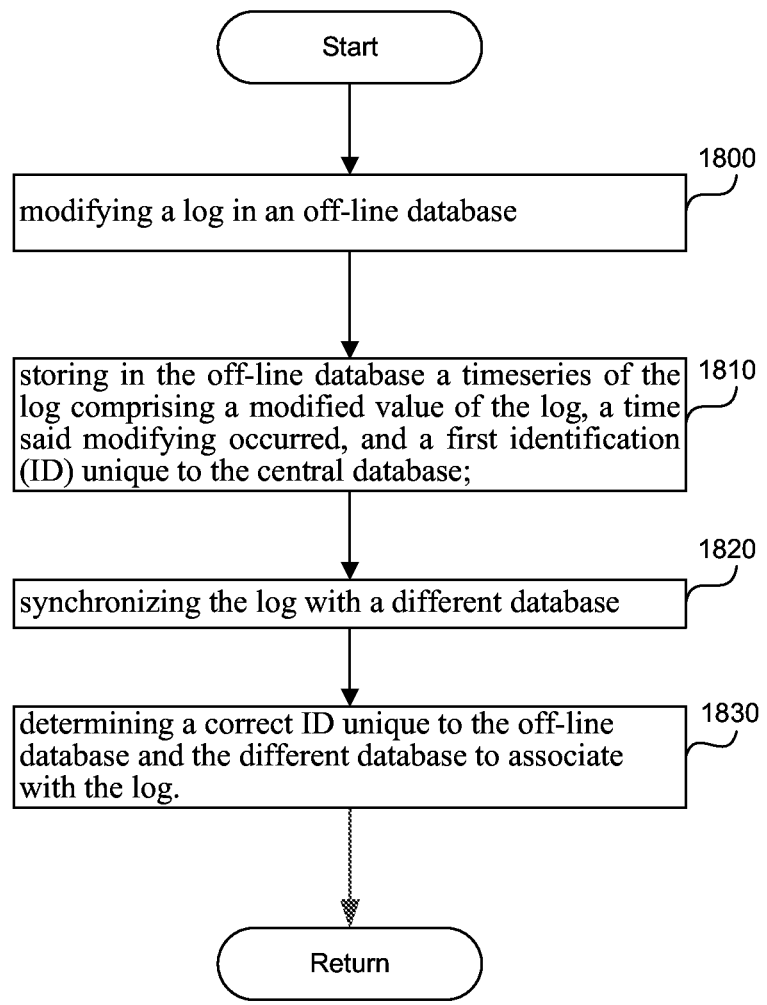
FIG. 18 is a flowchart of a method to maintain a central database associated with a server using a plurality of off-line databases associated with a plurality of off-line device.

FIG. 18 is a flowchart of a method to prevent corruption of a central database associated with a server using multiple off-line databases associated with multiple off-line devices. In step 1800, processor associated with a device modifies a log in an off-line database in the multiple off-line databases. The modifying can include creating a new log in the off-line database or editing an existing log in the off-line database. Log can be enrollment form, enrollment record, multiple entry, and/or longitudinal record. The log can include at least one record, such as of a name, an age, a gender, a region of origin, a favorite movie, a barcode ID, and/or a radio frequency ID.

In step 1810, the processor stores in the off-line database a timeseries of the log comprising a modified value of the log, a time said modifying occurred, and a first identification (ID) unique to the central database. To generate the ID, the processor generates a large random number and combines a device ID, a time when collection of the log started, and the large random number. The device ID is of a combination of the POSIX time when the software application first started and a large random number.

In step 1820, the processor synchronizes the log with a different database, which can be the central database or a second off-line database. The different database can include a second timeseries.

In step 1830, the processor determines a correct ID unique to the off-line database and the different database to associate with the log by comparing a time variability of the log specifying the period of time during which the log is expected to remain unchanged, the timeseries of the log and/or a second timeseries associated with the different database. The correct ID can be the first ID.

Modification of the log can include editing an existing record in the off-line database. The existing record can have a dependent record whose value varies based on the existing record. Once the existing record is updated, the processor automatically offers to the user to update the dependent record. The processor can automatically create a questionnaire including a list of likely values for the dependent record to present to the user. Alternatively, the list of likely values can be specified by the user. To automatically create the questionnaire, the processor can retrieve from the off-line database and/or the central database multiple most popular values associated with the dependent record.

For example, when the region of origin changes from United States to Nepal, the processor can automatically present the question to the respondent asking for the respondent's favorite food. The respondents favorite food, given that the respondents region of origin is Nepal, can be momo, noodles, dal bhat. The processor then receives the user entered response to the questionnaire.

Instead of automatically creating the list of likely responses for the dependent record, the processor can provide a notification to the user that the dependent record needs to be updated.

Modification of the log can include receiving from the user the log to add to the off-line database and a dependency between the log and a dependent log. The processor creates the log and the dependency in the off-line database. The processor can determine that the value of the log in the newly created, or newly designated dependent log are not likely pairs and the processor can automatically create a questionnaire comprising a list of likely values for the dependent log to present to the user. The processor then receives the user entered response to the questionnaire.

To assign to the log the correct ID unique to the off-line database, the processor can detect when two different respondents are assigned to the same ID. The log can include multiple records. The processor can retrieve from the different database a second log associated with the first ID. The second log includes a second multiplicity of records. The different database can be the central database or the second off-line database. Based on the multiple records, the processor can formulate a criterion which indicates whether the log and the second log are the same. Based on the multiple records of the log and the second log the processor can determine that the criterion is not satisfied, and associate the log with a second ID unique to the off-line database and the different database. The second ID is the correct ID unique to the off-line database and the different database, and the second ID and the first ID are different. The second ID can be a newly utilized ID unique to the whole system, or can be an ID already associated with a respondent.

To formulate the criterion, the processor creates a prioritized list of records based on the time variability associated with each record. The record least likely to change over time is at the top of the prioritized list of records, as described in this application. The processor can formulate the criterion to state that when at least one record at the top of the prioritized list is different between the log and the second log, the log and the second log are different.

To determine the correct ID unique to the off-line database and the different database, the processor can determine when two different IDs are assigned to the same respondent. This determination can be made after the processor has corrected an ID which has been associated with two different respondents, or the determination can be made in the process of synchronizing two databases. The processor retrieves from the different database a third log associated with the second ID. The third log includes a third multiplicity of records. Based on the multiple records, the processor formulates a criterion indicating that the log and the third log are the same. After comparing the records of the log and the third log, the processor determines that the criterion is satisfied, i.e., that the two logs belong to the same respondent. The processor associates the log with the second ID unique to the off-line database and the different database.

When the processor of a device, which can be either online, or off-line, detects a presence of a second device within 10 m, the device synchronizes the database on the device with a second database on the second device. To synchronize, the device receives encrypted multiple records from the second database. Upon determining that the user associated with the device has access to the encrypted multiple records, the processor decrypts the encrypted second multiplicity of records, and synchronizes the multiple records with the database.

When the processor of the device detects an availability of an Internet connection, the processor synchronizes a database on the device with the central database. The Internet connection can include mesh network, Wi-Fi, cellular network, LAN, etc.

To synchronize modifications to the same longitudinal record, i.e., timeseries, by different devices, the processor receives from at least two off-line databases multiple modifications to the log. The modification to the log can include a value and a time at which the value was entered. The processor records the timeseries of the log, which orders multiple modifications to the log from oldest to most recent.

The processor can automatically correct data entered by the user. For example, the processor can smooth out high-frequency log values entered by the user by performing a low-pass filter on the timeseries of the log. In addition to, or alternatively, the processor can correct the timeseries of the log by analyzing changes in the log over time, and remove a value of an abnormal log significantly different from values of the abnormal log's temporal neighbors. Temporal neighbors can be values surrounding the abnormal log value including one or more time periods.

Computer

Figure 19:
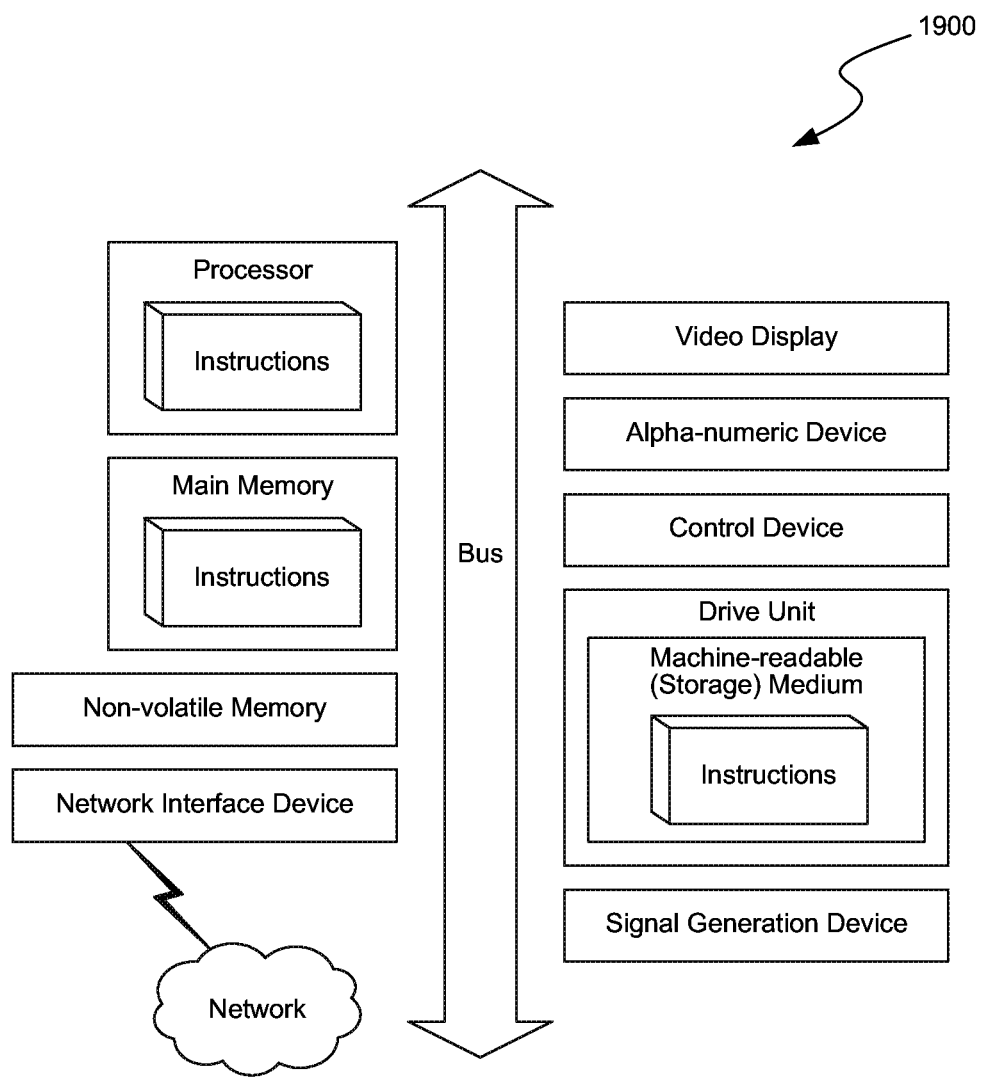
FIG. 19 is a diagrammatic representation of a machine in the example form of a computer system within which a set of instructions, for causing the machine to perform any one or more of the methodologies or modules discussed herein, may be executed.

FIG. 19 is a diagrammatic representation of a machine in the example form of a computer system 1900 within which a set of instructions, for causing the machine to perform any one or more of the methodologies or modules discussed herein, may be executed.

In the example of FIG. 19, the computer system 1900 includes a processor, memory, non-volatile memory, and an interface device. Various common components (e.g., cache memory) are omitted for illustrative simplicity. The computer system 1900 is intended to illustrate a hardware device on which any of the components described in the example of FIGS. 1-18 (and any other components described in this specification) can be implemented. The computer system 1900 can be of any applicable known or convenient type. The components of the computer system 1900 can be coupled together via a bus or through some other known or convenient device.

The processor of the computer system 1900 can be the processor associated with the intermittently online devices 112, 122, 132 in FIG. 1, or the server 102 in FIG. 1. The memory, and the nonvolatile memory of the computer system 1900 can store the databases 100, 110, 120, 130 in FIG. 1 on the server 102, and devices 112, 122, 132, respectively. The network interface of the computer system 1900 can be used to communicate between the devices 112, 122, 132, and the server 102. Further, the network in FIG. 19 can be a peer-to-peer network, the Internet, cellular network, a Wi-Fi network, Bluetooth network, etc.

This disclosure contemplates the computer system 1900 taking any suitable physical form. As example and not by way of limitation, computer system 1900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1900 may include one or more computer systems 1900; be unitary or distributed; span multiple locations; span multiple machines; or reside in a cloud, which may include one or more cloud components in one or more networks. Where appropriate, one or more computer systems 1900 may perform without substantial spatial or temporal limitation one or more steps of one or more methods described or illustrated herein. As an example and not by way of limitation, one or more computer systems 1900 may perform in real time or in batch mode one or more steps of one or more methods described or illustrated herein. One or more computer systems 1900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1900. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 19 reside in the interface.

In operation, the computer system 1900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed off-line database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to prevent corruption of a central database associated with a server using a plurality of off-line databases associated with a plurality of off-line devices, the method comprising:

receiving a response to a question in a questionnaire;

based on the response, editing a log in an off-line database in the plurality of off-line databases, the log indicating a received response to the questionnaire, the log comprising at least one record, wherein a record comprises at least one of a name, an age, a gender, a region of origin, a barcode ID, or a radio frequency ID;

storing in the off-line database a timeseries of the log comprising an edited value of the log and a time said editing occurred;

correcting the timeseries of the log by analyzing changes in the log over time, and removing a value of an abnormal log significantly different from values of the abnormal log's temporal neighbors;

synchronizing the log with a different database comprising at least one of the central database or a second off-line database in the plurality of off-line databases, the different database including a second timeseries comprising a second value and a second time associated with the second value; and preventing corruption of the different database by determining a correct ID unique to the off-line database and the different database to associate with the log, said preventing corruption comprising:

determining a time variability of the log, the time variability indicating a period of time during which the log is expected to remain unchanged;

when the time of the timeseries and the second time of the second timeseries are within the time variability of the log and the edited value of the log and the second value are substantially identical, indicating that the timeseries and the second timeseries correspond to a same ID; and when the time of the timeseries and the second time of the second timeseries are within the time variability of the edited log, and the edited value of the log and the second value are substantially different, indicating that the timeseries and the second timeseries need to be associated with different IDs.

2. A method comprising:

receiving a response to a question in a questionnaire;

based on the response modifying a log in an off-line database in a plurality of off-line databases, said modifying comprising creating a new log in the off-line database or editing an existing log in the off-line database, the log indicating a received response to the questionnaire;

storing in the off-line database the log including a timeseries of the log comprising a modified value of the log and a time said modifying occurred;

correcting the timeseries of the log by analyzing changes in the log over time, and removing a value of an abnormal log significantly different from values of the abnormal log's temporal neighbors;

synchronizing the log with a different database comprising at least one of a central database or a second off-line database in the plurality of off-line databases, the different database including a second timeseries comprising a second value and a second time associated with the second value; and preventing corruption of the different database by determining a correct ID unique to the off-line database and the different database to associate with the log, said preventing corruption comprising:

determining a time variability of the modified log, the time variability indicating a period of time during which the log is expected to remain unchanged;

when the time of the timeseries and the second time of the second timeseries are within the time variability of the modified log and the modified value and the second value are substantially identical, indicating that the timeseries and the second timeseries correspond to a same ID; and when the time of the timeseries and the second time of the second timeseries are within the time variability of the modified log, and the modified value and the second value are substantially different, indicating that the timeseries and the second timeseries need to be associated with different IDs.

3. The method of claim 2, the log comprising at least one record, wherein a record comprises at least one of a name, an age, a gender, a region of origin, a barcode ID, or a radio frequency ID.

4. A method of claim 2, said modifying the log comprising:

editing an existing record in the off-line database;

determining that the existing record has a dependent record which varies based on the existing record; and updating the dependent record.

5. The method of claim 4, said updating the dependent record comprising:

automatically creating a second questionnaire comprising a list of likely values for the dependent record to present to a user; and receiving a user response to the second questionnaire.

6. The method of claim 5, said automatically creating the second questionnaire comprising:

based on the edited existing record, retrieving from the off-line database a plurality of most popular values associated with the dependent record.

7. The method of claim 4, said updating the dependent record comprising:

providing a notification to a user that the dependent record needs to be updated.

8. A method of claim 2, said modifying the log comprising:
receiving from a user the log to add to the off-line database and a dependency between the log and a dependent log;
creating the log and the dependency in the off-line database;
automatically creating a second questionnaire comprising a list of likely values for the dependent log to present to the user; and
receiving a user response to the second questionnaire.

9. The method of claim 2, wherein the log comprises a plurality of records; said determining the correct ID unique to the off-line database and the different database comprising:
retrieving from the different database a second log associated with a first identification (ID), the first ID associated with the log, the second log comprising a second plurality of records, wherein the different database comprises at least one of the central database or the second off-line database in the plurality of off-line databases;
based on the plurality of records, formulating a criterion indicating that the log and the second log are the same;
based on the log and the second log determining that the criterion is not satisfied; and
associating the log with a second ID unique to the off-line database and the different database, wherein the second ID is the correct ID unique to the off-line database and the different database, and wherein the second ID and the first ID are different.

10. The method of claim 9, said formulating the criterion comprising:
based on the plurality of records and a time variability associated with each record in the plurality of records, creating a prioritized list of records, wherein a record least likely to change over time is at the top of the prioritized list of records; and
formulating the criterion to state that when at least one record at the top of the prioritized list of records is different between the log and the second log, the log and the second log are different.

11. The method of claim 9, said determining the correct ID unique to the off-line database and the different database comprising:
retrieving from the different database a third log associated with the second ID, the third log comprising a third plurality of records;
based on the plurality of records, formulating the criterion indicating that the log and the third log are the same;
based on the log and the third log determining that the criterion is satisfied; and
associating the log with the second ID unique to the off-line database and the different database.

12. The method of claim 2, comprising:
generating a large random number; and
generating a first ID associated with the log by a device associated with the off-line database by combining a device ID, a time when collection of the log started, and the large random number.

13. The method of claim 2, comprising:
detecting a presence of a second device in a plurality of off-line devices; and
synchronizing the off-line database with the second off-line database associated with the second device.

14. The method of claim 2, comprising:
detecting an availability of an Internet connection; and
synchronizing the off-line database with the central database.

15. The method of claim 2, comprising:
receiving from at least two off-line databases a plurality of modifications to the log, a modification to the log in the plurality of modifications to the log comprising a value and a time at which the value was entered; and
recording the timeseries of the log, wherein the timeseries orders the plurality of modifications to the log from oldest to most recent.

16. A system comprising:
a central database associated with a server;
a plurality of off-line databases associated with a plurality of off-line devices;
a processor;
a storage medium storing computer-executable instructions that, when executed by the processor, cause the system to perform a computer-implemented operation, the instructions comprising:
instructions for receiving a response to a question in a questionnaire;
instructions for based on the response modifying a log in an off-line database in the plurality of off-line databases, said modifying comprising creating a new log in the off-line database or editing an existing log in the off-line database, the log indicating a received response to the questionnaire;
instructions for storing in the off-line database a timeseries of the log comprising a modified value of the log and a time said modifying occurred;
instructions for storing correcting the timeseries of the log by analyzing changes in the log over time, and removing a value of an abnormal log significantly different from values of the abnormal log's temporal neighbors;
instructions for synchronizing the log with a different database comprising at least one of the central database or a second off-line database in the plurality of off-line databases, the different database comprising a second timeseries comprising a second value and a second time associated with the second value; and
instructions for preventing corruption of the different database by determining a correct ID unique to the off-line database and the different database to associate with the log, the instructions comprising:
instructions for determining a time variability of the modified log, the time variability indicating a period of time during which the log is expected to remain unchanged;
when the time of the timeseries and the second time of the second timeseries are within the time variability of the modified log and the modified value and the second value are substantially identical, instructions for indicating that the timeseries and the second timeseries correspond to a same ID; and
when the time of the timeseries and the second time of the second timeseries are within the time variability of the modified log, and the modified value and the second value are substantially different, instructions for indicating that the timeseries and the second timeseries need to be associated with different IDs.

17. The system of claim 16, the log comprising at least one record, wherein a record comprises at least one of a name, an age, a gender, a region of origin, a barcode ID, or a radio frequency ID.

18. A system of claim 16, the instructions for modifying the log comprising:
  instructions for editing an existing record in the off-line database;
  instructions for determining that the existing record has a dependent record which varies based on the existing record; and
  instructions for updating the dependent record.

19. The system of claim 18, the instructions for updating the dependent record comprising:
  instructions for automatically creating a second questionnaire comprising a list of likely values for the dependent record to present to a user; and
  instructions for receiving a user response to the second questionnaire.

20. The system of claim 19, the instructions for updating the dependent record comprising:
  instructions for providing a notification to the user that the dependent record needs to be updated.

21. A system of claim 16, the instructions for modifying the log comprising:
  instructions for receiving from a user the log to add to the off-line database and a dependency between the log and a dependent log;
  instructions for creating the log and the dependency in the off-line database;
  instructions for automatically creating a second questionnaire comprising a list of likely values for the dependent log to present to the user; and
  instructions for receiving a user response to the second questionnaire.

22. The system of claim 16, wherein the log comprises a plurality of records; instructions for determining the correct ID unique to the off-line database and the different database comprising:
  instructions for retrieving from the different database a second log associated with a first ID, the first ID associated with the log, the second log comprising a second plurality of records, wherein the different database comprises at least one of the central database or the second off-line database in the plurality of off-line databases;
  instructions for, based on the plurality of records, formulating a criterion indicating that the log and the second log are the same;
  instructions for, based on the log and the second log determining that the criterion is not satisfied; and
  instructions for associating the log with a second ID unique to the off-line database and the different database, wherein the second ID is the correct ID unique to the off-line database and the different database, and wherein the second ID and the first ID are different.

23. The system of claim 22, the instructions for formulating the criterion comprising:
  instructions for, based on the plurality of records and a time variability associated with each record in the plurality of records, creating a prioritized list of records, wherein a record least likely to change over time is at the top of the prioritized list of records; and
  instructions for formulating the criterion to state that when at least one record at the top of the prioritized list of records is different between the log and the second log, the log and the second log are different.

24. The system of claim 16, wherein the log comprises a plurality of records; instructions for determining the correct ID unique to the off-line database and the different database comprising:
  instructions for retrieving from the different database a second log associated with a second ID, the second log comprising a second plurality of records;
  instructions for, based on the plurality of records, formulating a criterion indicating that the log and the second log are the same;
  based on the log and the second log determining that the criterion is satisfied; and
  associating the log with the second ID unique to the off-line database and the different database.

25. The system of claim 24, instructions for formulating the criterion comprising:
  instructions for determining that a record in the plurality of records and a corresponding record in the second plurality of records correspond to each other;
  instructions for determining a time variability associated with the record in the plurality of records and the corresponding record in the second plurality of records, wherein the time variability specifies a time period during which the record and the corresponding record are expected to remain unchanged;
  instructions for retrieving the time when the record was modified and a third time when the corresponding record was entered; and
  instructions for formulating the criterion to state that when a predetermined number of records between the plurality of records and the second plurality of records match, the log and the second log are the same.

26. The system of 16, comprising:
  instructions for generating a large random number; and
  instructions for generating a first ID associated with the log by a device associated with the off-line database by combining a device ID, a time when collection of the log started, and the large random number.

27. The system of claim 16, comprising:
  instructions for detecting a presence of a second device in the plurality of off-line devices;
  instructions for synchronizing the off-line database with the second off-line database associated with the second device.

28. The system of claim 16, comprising:
  instructions for detecting an availability of an Internet connection; and
  instructions for synchronizing the off-line database with the central database.

29. The system of claim 16, comprising:
  instructions for receiving from at least two off-line databases a plurality of modifications to the log, a modification to the log in the plurality of modifications to the log comprising a value and a time at which the value was entered; and
  instructions for recording the timeseries of the log, wherein the timeseries orders the plurality of modifications to the log from oldest to most recent.

* * * * *